US012621864B2

(12) United States Patent
Sakhnini et al.

(10) Patent No.: US 12,621,864 B2
(45) Date of Patent: May 5, 2026

(54) DOWNLINK INITIAL ACCESS SIGNAL TO RANDOM ACCESS CHANNEL OCCASION ASSOCIATION

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 17/203,270

(22) Filed: Mar. 16, 2021

(65) Prior Publication Data

US 2022/0304060 A1    Sep. 22, 2022

(51) Int. Cl.
| | | |
|---|---|---|
| *H04W 74/0833* | (2024.01) | |
| *H04W 74/0836* | (2024.01) | |
| *H04W 74/0838* | (2024.01) | |

(52) U.S. Cl.
CPC .... *H04W 74/0833* (2013.01); *H04W 74/0836* (2024.01); *H04W 74/0838* (2024.01)

(58) Field of Classification Search
CPC ................................................. H04W 74/0833
See application file for complete search history.

(56) References Cited

U.S. PATENT DOCUMENTS

| | | | | |
|---|---|---|---|---|
| 2010/0208700 A1* | 8/2010 | Shi | ..................... | H04W 36/322 |
| | | | | 370/331 |
| 2016/0242159 A1* | 8/2016 | Ho | ........................ | H04W 48/00 |

| | | | | |
|---|---|---|---|---|
| 2018/0014284 A1* | 1/2018 | Yi | .......................... | H04L 5/0048 |
| 2018/0176958 A1* | 6/2018 | Islam | ..................... | H04W 56/00 |
| 2019/0089446 A1* | 3/2019 | Zhang | ................... | H04L 5/0053 |
| 2019/0356524 A1* | 11/2019 | Yi | ......................... | H04L 27/2655 |
| 2020/0053772 A1* | 2/2020 | Pan | ....................... | H04B 17/327 |
| 2020/0229157 A1* | 7/2020 | Rastegardoost | .. | H04W 74/0833 |
| 2020/0275483 A1* | 8/2020 | Li | .......................... | H04L 5/0078 |
| 2020/0288506 A1* | 9/2020 | Lei | .................... | H04W 74/0833 |
| 2020/0383141 A1* | 12/2020 | Lei | .................... | H04W 74/0833 |

(Continued)

FOREIGN PATENT DOCUMENTS

WO      WO-2021031990      2/2021

OTHER PUBLICATIONS

Qualcomm "Initial access aspects for NR to support operation between 52.6 GHz and 71 GHz", 3GPP R1-2101453, Jan. 19, 2021 (Year: 2021).*

(Continued)

*Primary Examiner* — Chuong M Nguyen
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a base station, configuration information indicating a downlink initial access signal (IAS) to random access channel (RACH) occasion association pattern, wherein the downlink IAS to RACH occasion association pattern indicates at least one of switching gaps between downlink IAS occasions and between RACH occasions or guard bands between RACH occasions. The UE may transmit, to the base station, a RACH message using a RACH occasion according to the downlink IAS to RACH occasion association pattern. Numerous other aspects are described.

30 Claims, 16 Drawing Sheets

(56) References Cited

U.S. PATENT DOCUMENTS

| | | | |
|---|---|---|---|
| 2020/0396744 A1* | 12/2020 | Xiong | H04L 27/2636 |
| 2021/0100038 A1* | 4/2021 | Ly | H04L 27/261 |
| 2021/0153245 A1* | 5/2021 | Tooher | H04W 72/0453 |
| 2021/0307033 A1* | 9/2021 | Josan | H04W 72/0446 |
| 2021/0314866 A1* | 10/2021 | Lee | H04W 52/0229 |
| 2022/0022173 A1* | 1/2022 | Oh | H04L 1/1607 |
| 2022/0159744 A1* | 5/2022 | Shin | H04W 74/0833 |
| 2022/0225422 A1* | 7/2022 | Kundu | H04W 16/14 |
| 2023/0397256 A1* | 12/2023 | Wang | H04B 7/0695 |

OTHER PUBLICATIONS

International Search Report and Written Opinion—PCT/US2022/070551—ISA/EPO—May 24, 2022.
Qualcomm Incorporated: "Initial Access Aspects for NR to Support Operation Between 52.6 GHz and 71 GHz", 3GPP Draft, 3GPP TSG-RAN WG1 #104-e, R1-2101453, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051971618, 14 Pages.

* cited by examiner

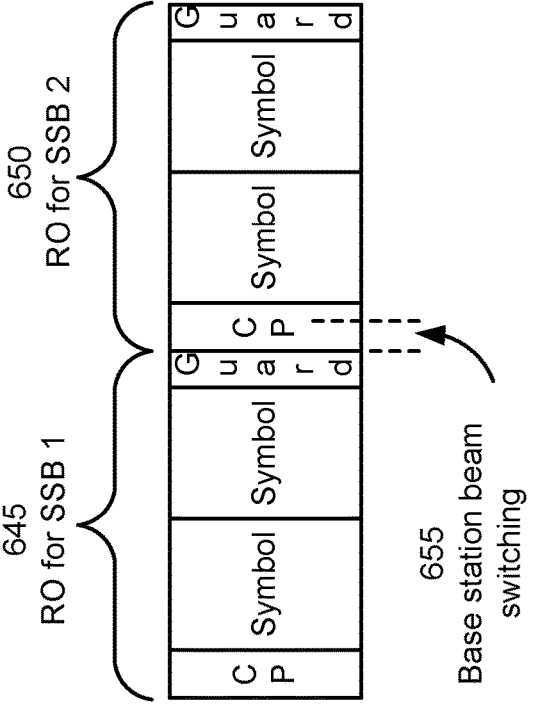
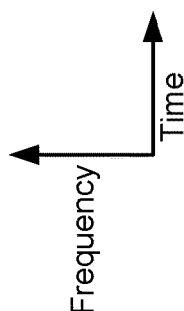
FIG. 6B

700

Base Station 110

UE 120

705
Determine downlink IAS to RACH occasion association pattern

710
Downlink IAS to RACH occasion association pattern

715
Downlink IAS(s)

720
Select a RACH occasion based on the downlink IAS to RACH occasion association pattern 725
RACH message using the RACH occasion 730
Perform RACH procedure

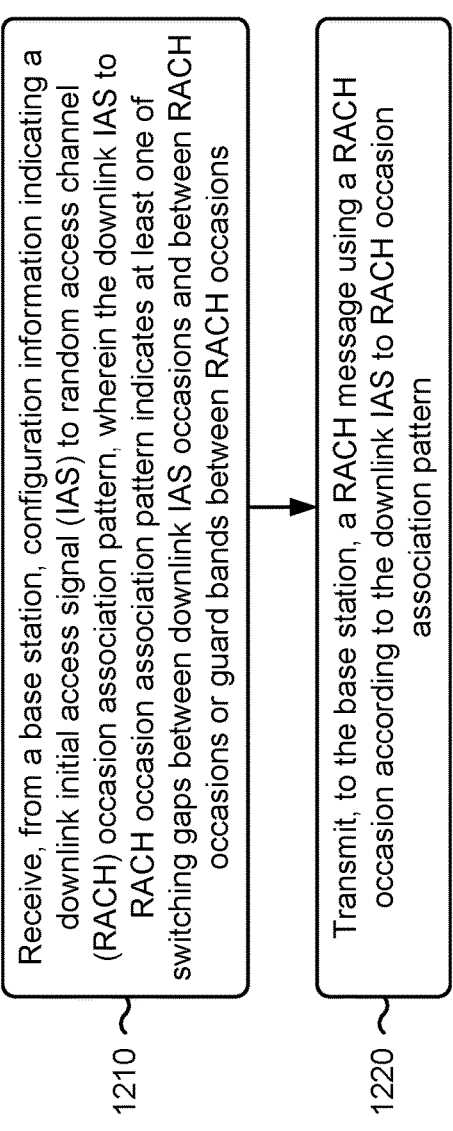

1210 — Receive, from a base station, configuration information indicating a downlink initial access signal (IAS) to random access channel (RACH) occasion association pattern, wherein the downlink IAS to RACH occasion association pattern indicates at least one of switching gaps between downlink IAS occasions and between RACH occasions or guard bands between RACH occasions 1220 — Transmit, to the base station, a RACH message using a RACH occasion according to the downlink IAS to RACH occasion association pattern

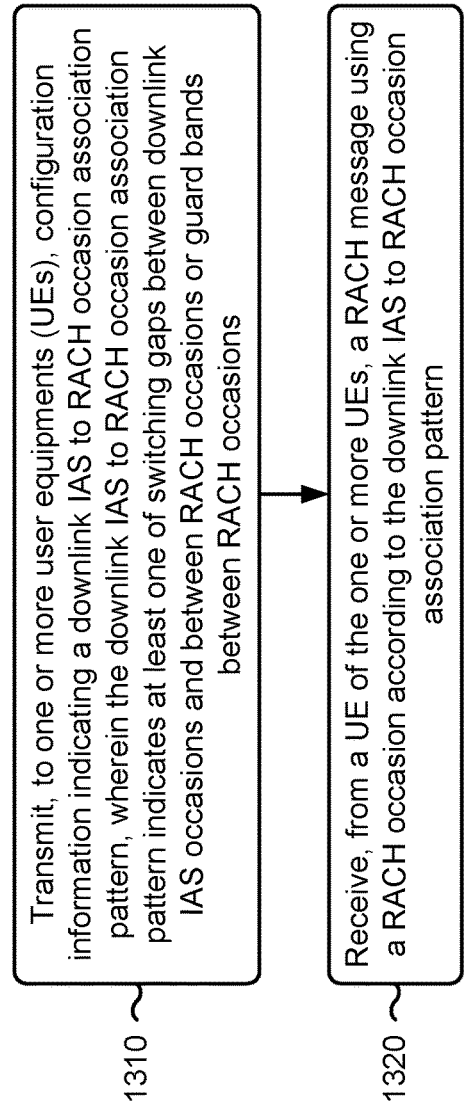

1310 Transmit, to one or more user equipments (UEs), configuration information indicating a downlink IAS to RACH occasion association pattern, wherein the downlink IAS to RACH occasion association pattern indicates at least one of switching gaps between downlink IAS occasions and between RACH occasions or guard bands between RACH occasions 1320 Receive, from a UE of the one or more UEs, a RACH message using a RACH occasion according to the downlink IAS to RACH occasion association pattern

DOWNLINK INITIAL ACCESS SIGNAL TO RANDOM ACCESS CHANNEL OCCASION ASSOCIATION

FIELD OF THE DISCLOSURE

Aspects of the present disclosure generally relate to wireless communication and to techniques and apparatuses for downlink initial access signal (IAS) to random access channel (RACH) occasion association.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a base station, configuration information indicating a downlink initial access signal (IAS) to random access channel (RACH) occasion association pattern, wherein the downlink IAS to RACH occasion association pattern indicates at least one of switching gaps between downlink IAS occasions and between RACH occasions or guard bands between RACH occasions; and transmit, to the base station, a RACH message using a RACH occasion according to the downlink IAS to RACH occasion association pattern.

In some aspects, a base station for wireless communication includes a memory and one or more processors, coupled to the memory, configured to: transmit, to one or more UEs, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions; and receive, from a UE of the one or more UEs, a RACH message using a RACH occasion according to the downlink IAS to RACH occasion association pattern.

In some aspects, a method of wireless communication performed by a UE includes receiving, from a base station, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions; and transmitting, to the base station, a RACH message using a RACH occasion according to the downlink IAS to RACH occasion association pattern.

In some aspects, a method of wireless communication performed by a base station includes transmitting, to one or more UEs, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions; and receiving, from a UE of the one or more UEs, a RACH message using a RACH occasion according to the downlink IAS to RACH occasion association pattern.

In some aspects, a non-transitory computer-readable medium storing a set of instructions for wireless communication includes one or more instructions that, when executed by one or more processors of a UE, cause the UE to: receive, from a base station, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions; and transmit, to the base station, a RACH message using a RACH occasion according to the downlink IAS to RACH occasion association pattern.

In some aspects, a non-transitory computer-readable medium storing a set of instructions for wireless communication includes one or more instructions that, when executed by one or more processors of a base station, cause the base station to: transmit, to one or more UEs, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions; and receive, from a UE of the one or more UEs, a RACH message using a RACH occasion according to the downlink IAS to RACH occasion association pattern.

In some aspects, an apparatus for wireless communication includes means for receiving, from a base station, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions; and means for transmitting, to the base station, a RACH message using a RACH occasion according to the downlink IAS to RACH occasion association pattern.

In some aspects, an apparatus for wireless communication includes means for transmitting, to one or more UEs, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions; and means for receiving, from a UE of the one or more UEs, a RACH message using a RACH occasion according to the downlink IAS to RACH occasion association pattern.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A and 6B are diagrams illustrating an example of SS block (SSB) to random access channel (RACH) occasion association, in accordance with the present disclosure.

FIGS. 12 and 13 are diagrams illustrating example processes associated with downlink IAS to RACH occasion association, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
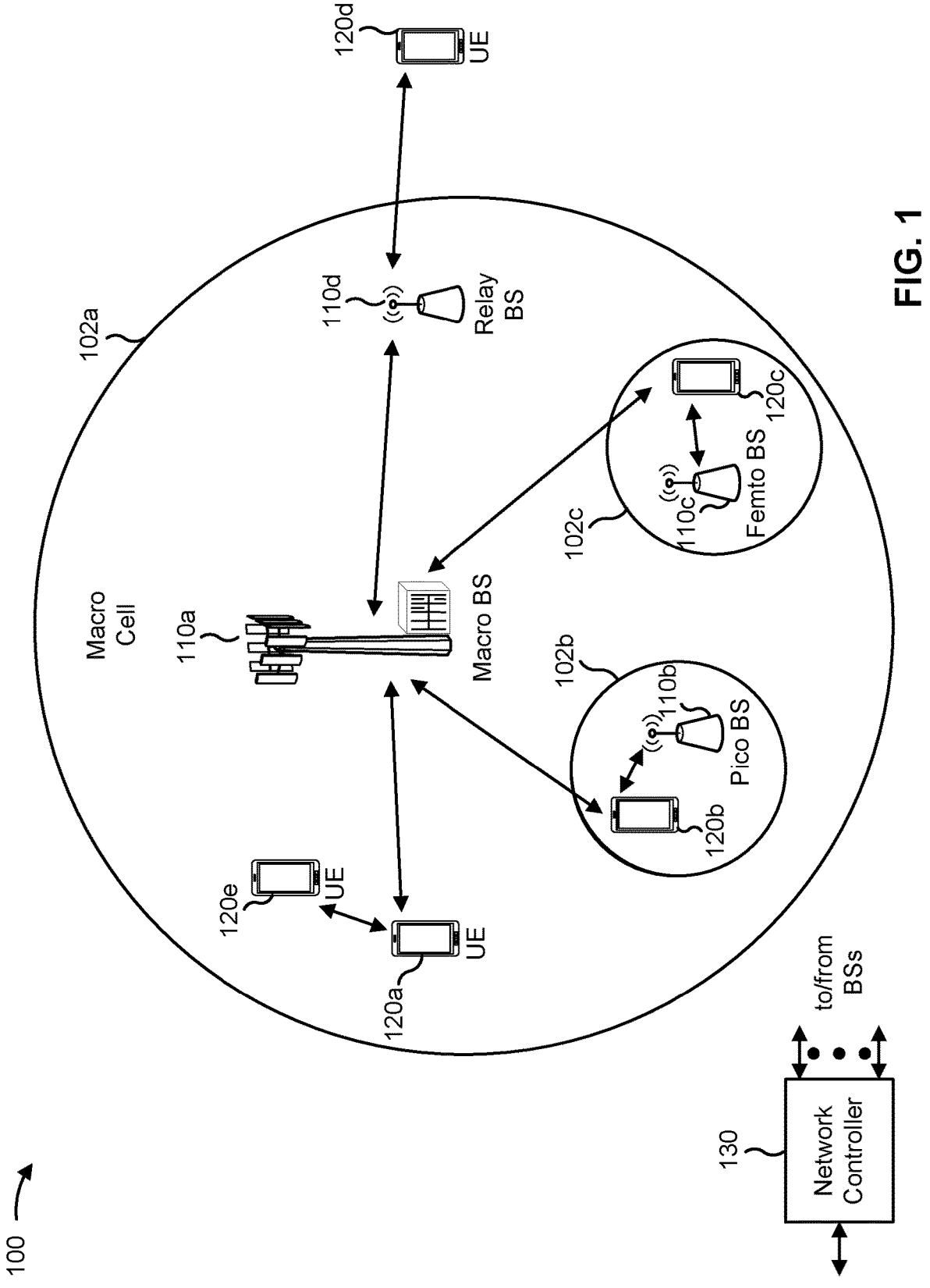
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
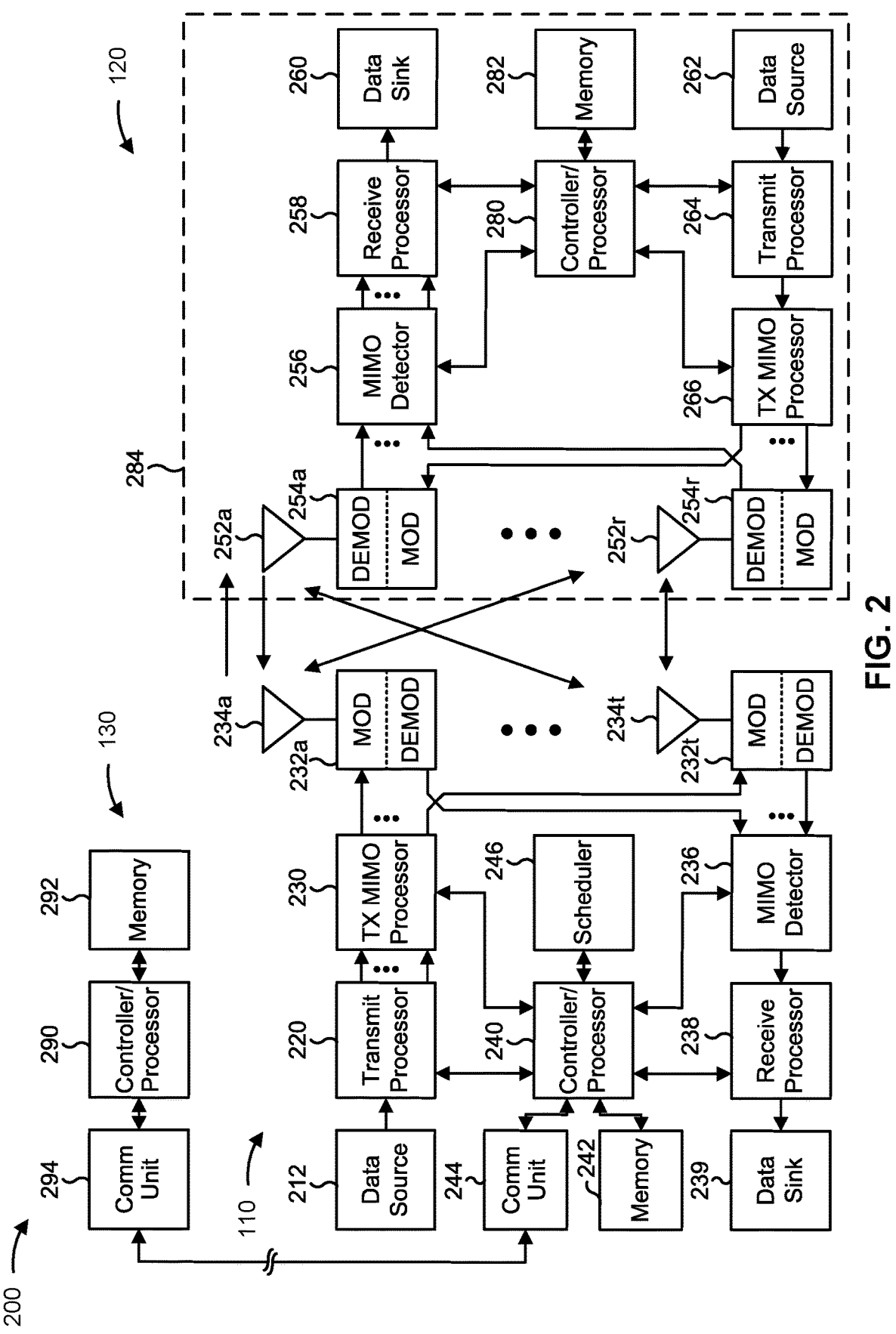
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-13).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-13).

Controller/processor 240 of base station 110, controller/processor 280 of UE 120, and/or any other component(s) of FIG. 2 may perform one or more techniques associated with downlink initial access signal (IAS) to random access channel (RACH) occasion association, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, the UE 120 includes means for receiving, from a base station, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions (e.g., using antenna 252, DEMOD 254, MIMO detector 256, receive processor 258, controller/processor 280, and/or memory 282); and/or means for transmitting, to the base station, a RACH message using a RACH occasion according to the downlink IAS to RACH occasion association pattern (e.g., using controller/processor 280, transmit processor 264, TX MIMO processor 266, MOD 254, antenna 252, and/or memory 282). The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving an indication that the downlink IAS to RACH occasion association pattern includes a group of downlink IAS occasions for different beams associated with the base station and a group of RACH occasions associated with the group of downlink IAS occasions, wherein the group of downlink IAS occasions are grouped together in a time domain and the group of RACH occasions are grouped together in the time domain (e.g., using antenna 252, DEMOD 254, MIMO detector 256, receive processor 258, controller/processor 280, and/or memory 282).

In some aspects, the UE 120 includes means for receiving an indication that the downlink IAS to RACH occasion association pattern includes a downlink IAS associated with a beam grouped with a RACH occasion associated with the beam in a time domain (e.g., using antenna 252, DEMOD 254, MIMO detector 256, receive processor 258, controller/processor 280, and/or memory 282).

In some aspects, the UE 120 includes means for receiving an indication that the downlink IAS and the RACH occasion are multiplexed in at least one of the time domain or a frequency domain (e.g., using antenna 252, DEMOD 254, MIMO detector 256, receive processor 258, controller/processor 280, and/or memory 282).

In some aspects, the UE 120 includes means for receiving an indication of a downlink/uplink switching gap between the downlink IAS and the RACH occasion (e.g., using antenna 252, DEMOD 254, MIMO detector 256, receive processor 258, controller/processor 280, and/or memory 282).

In some aspects, the UE 120 includes means for receiving an indication that the downlink IAS to RACH occasion association pattern includes a first order of RACH occasions in a time domain for a first association period and a second order of RACH occasions in the time domain for a second association period (e.g., using antenna 252, DEMOD 254, MIMO detector 256, receive processor 258, controller/processor 280, and/or memory 282).

In some aspects, the UE 120 includes means for receiving an indication that the downlink IAS to RACH occasion association pattern includes a first downlink IAS associated with a first number of RACH occasions and a second downlink IAS associated with a second number of RACH occasions (e.g., using antenna 252, DEMOD 254, MIMO detector 256, receive processor 258, controller/processor 280, and/or memory 282).

In some aspects, the UE 120 includes means for receiving an indication that the downlink IAS to RACH occasion association pattern includes a first RACH occasion frequency division multiplexed with a second RACH occasion and a guard band included between the first RACH occasion and the second RACH occasion in a frequency domain (e.g., using antenna 252, DEMOD 254, MIMO detector 256, receive processor 258, controller/processor 280, and/or memory 282).

In some aspects, the UE 120 includes means for receiving an indication that the downlink IAS to RACH occasion association pattern is associated with a single carrier waveform type (e.g., using antenna 252, DEMOD 254, MIMO detector 256, receive processor 258, controller/processor 280, and/or memory 282).

In some aspects, the UE 120 includes means for receiving an indication that the switching gaps include at least one of downlink to uplink switching gaps or beam switching gaps, wherein a switching gap includes: an explicit switching gap, a switching gap included in a cyclic prefix, a sub-symbol switching gap, an extended guard period switching gap, or any combination thereof (e.g., using antenna 252, DEMOD 254, MIMO detector 256, receive processor 258, controller/processor 280, and/or memory 282).

In some aspects, the base station 110 includes means for transmitting, to one or more UEs, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions (e.g., using controller/processor 240, transmit processor 220, TX MIMO processor 230, MOD 232, antenna 234, and/or memory 242); and/or means for receiving, from a UE of the one or more UEs, a RACH message using a RACH occasion according to the downlink IAS to RACH occasion association pattern (e.g., using antenna 234, DEMOD 232, MIMO detector 236, receive processor 238, controller/processor 240, and/or memory 242). The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for transmitting an indication that the downlink IAS to RACH occasion association pattern includes a group of downlink IAS occasions for different beams associated with the base station and a group of RACH occasions associated with the group of downlink IAS occasions, wherein the group of downlink IAS occasions are grouped together in a time domain and the group of RACH occasions are grouped together in the time domain (e.g., using controller/processor 240, transmit processor 220, TX MIMO processor 230, MOD 232, antenna 234, and/or memory 242).

In some aspects, the base station 110 includes means for transmitting an indication that the downlink IAS to RACH occasion association pattern includes a downlink IAS associated with a beam grouped with a RACH occasion associated with the beam in a time domain (e.g., using controller/processor 240, transmit processor 220, TX MIMO processor 230, MOD 232, antenna 234, and/or memory 242).

In some aspects, the base station 110 includes means for transmitting an indication that the downlink IAS and the RACH occasion are multiplexed in at least one of the time domain or a frequency domain (e.g., using controller/processor 240, transmit processor 220, TX MIMO processor 230, MOD 232, antenna 234, and/or memory 242).

In some aspects, the base station 110 includes means for transmitting an indication of a downlink/uplink switching gap between the downlink IAS and the RACH occasion (e.g., using controller/processor 240, transmit processor 220, TX MIMO processor 230, MOD 232, antenna 234, and/or memory 242).

In some aspects, the base station 110 includes means for determining the downlink IAS to RACH occasion association pattern based at least in part on: a length of a downlink to uplink switching time of the base station, a length of a beam switching time of the base station, a number of downlink IAS occasions associated with the downlink IAS to RACH occasion association pattern, an amount of time associated with channel acquisition for the UE, or any combination thereof (e.g., using controller/processor 240 and/or memory 242).

In some aspects, the base station 110 includes means for determining whether the downlink IAS to RACH occasion association pattern includes: downlink IASs grouped together and RACH occasions group together, or downlink IASs and RACH occasions associated with a same beam grouped together (e.g., using controller/processor 240 and/or memory 242).

In some aspects, the base station 110 includes means for transmitting an indication that the downlink IAS to RACH occasion association pattern includes a first order of RACH occasions in a time domain for a first association period and a second order of RACH occasions in the time domain for a second association period (e.g., using controller/processor 240, transmit processor 220, TX MIMO processor 230, MOD 232, antenna 234, and/or memory 242).

In some aspects, the base station 110 includes means for transmitting an indication that the downlink IAS to RACH occasion association pattern includes a first downlink IAS associated with a first number of RACH occasions and a second downlink IAS associated with a second number of RACH occasions (e.g., using controller/processor 240, transmit processor 220, TX MIMO processor 230, MOD 232, antenna 234, and/or memory 242).

In some aspects, the base station 110 includes means for transmitting an indication that the downlink IAS to RACH occasion association pattern includes a first RACH occasion frequency division multiplexed with a second RACH occasion and a guard band included between the first RACH occasion and the second RACH occasion in a frequency domain (e.g., using controller/processor 240, transmit processor 220, TX MIMO processor 230, MOD 232, antenna 234, and/or memory 242).

In some aspects, the base station 110 includes means for filtering a frequency domain resource allocation associated with the RACH occasion used to transmit the RACH message (e.g., using controller/processor 240, transmit processor 220, TX MIMO processor 230, MOD 232, antenna 234, and/or memory 242); and/or means for applying single carrier processing for the frequency domain resource allocation associated with the RACH occasion used to transmit the RACH message (e.g., using controller/processor 240, transmit processor 220, TX MIMO processor 230, MOD 232, antenna 234, and/or memory 242).

In some aspects, the base station 110 includes means for transmitting an indication that the downlink IAS to RACH occasion association pattern is associated with a single carrier waveform type (e.g., using controller/processor 240, transmit processor 220, TX MIMO processor 230, MOD 232, antenna 234, and/or memory 242).

In some aspects, the base station 110 includes means for transmitting an indication that the switching gaps include at least one of downlink to uplink switching gaps or beam switching gaps, wherein a switching gap includes: an explicit switching gap, a switching gap included in a cyclic prefix, a sub-symbol switching gap, an extended guard period switching gap, or any combination thereof (e.g., using controller/processor 240, transmit processor 220, TX MIMO processor 230, MOD 232, antenna 234, and/or memory 242).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
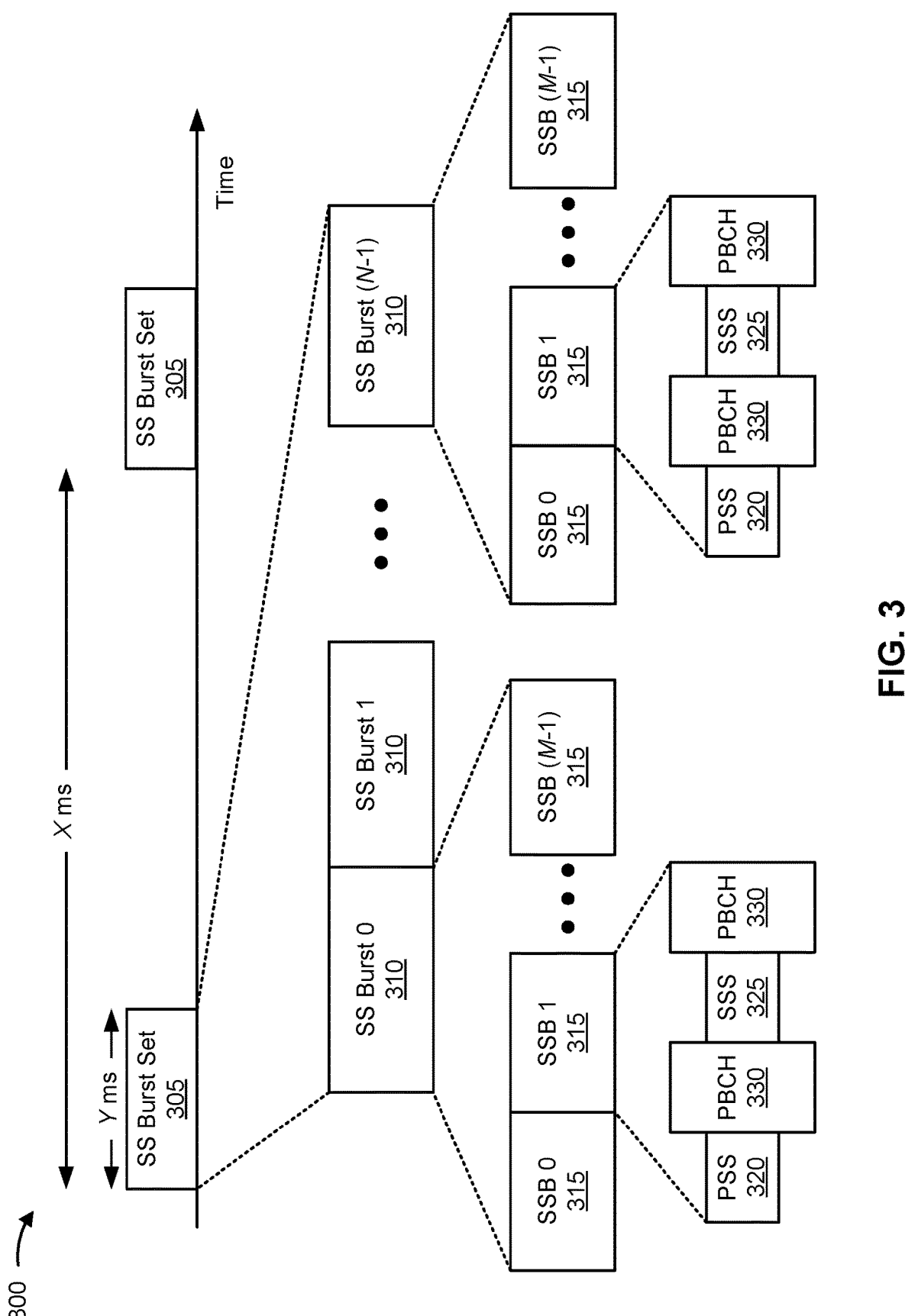
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where Nis a maximum number of repetitions of the SS burst 310 that may be transmitted by the base station. As further shown, each SS burst 310 may include one or more SS blocks (SSBs) 315, shown as SSB 0 through SSB M−1, where M is a maximum number of SSBs 315 that can be carried by an SS burst 310. In some aspects, different SSBs 315 may be beam-formed differently (e.g., transmitted using different beams), and may be used for cell search, cell acquisition, beam management, and/or beam selection (e.g., as part of an initial network access procedure). An SS burst set 305 may be periodically transmitted by a wireless node (e.g., base station 110), such as every X milliseconds, as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window or an SSB measurement time configuration (SMTC) window.

In some aspects, an SSB 315 may include resources that carry a primary synchronization signal (PSS) 320, a secondary synchronization signal (SSS) 325, and/or a physical broadcast channel (PBCH) 330. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., base station 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure and/or a cell search procedure, among other examples. For example, the UE 120 may monitor for and/or measure SSBs 315 using different Rx beams during a random access procedure to identify a RACH occasion to use to transmit a RACH occasion (e.g., as described in more detail below). Based at least in part on the monitoring and/or measuring, the UE 120 may indicate one or more SSBs 315 with a best signal parameter (e.g., a reference signal received power (RSRP) parameter) to a base station 110. The base station 110 and the UE 120 may use the one or more indicated SSBs 315 to select one or more beams to be used for communication between the base station 110 and the UE 120 (e.g., for a RACH procedure). Additionally, or alternatively, the UE 120 may use the SSB 315 and/or the SSB index to determine a cell timing for a cell via which the SSB 315 is received (e.g., a serving cell).

As indicated above, FIG. 3 is provided as an example. Other examples may differ from what is described with regard to FIG. 3.

Figure 4:
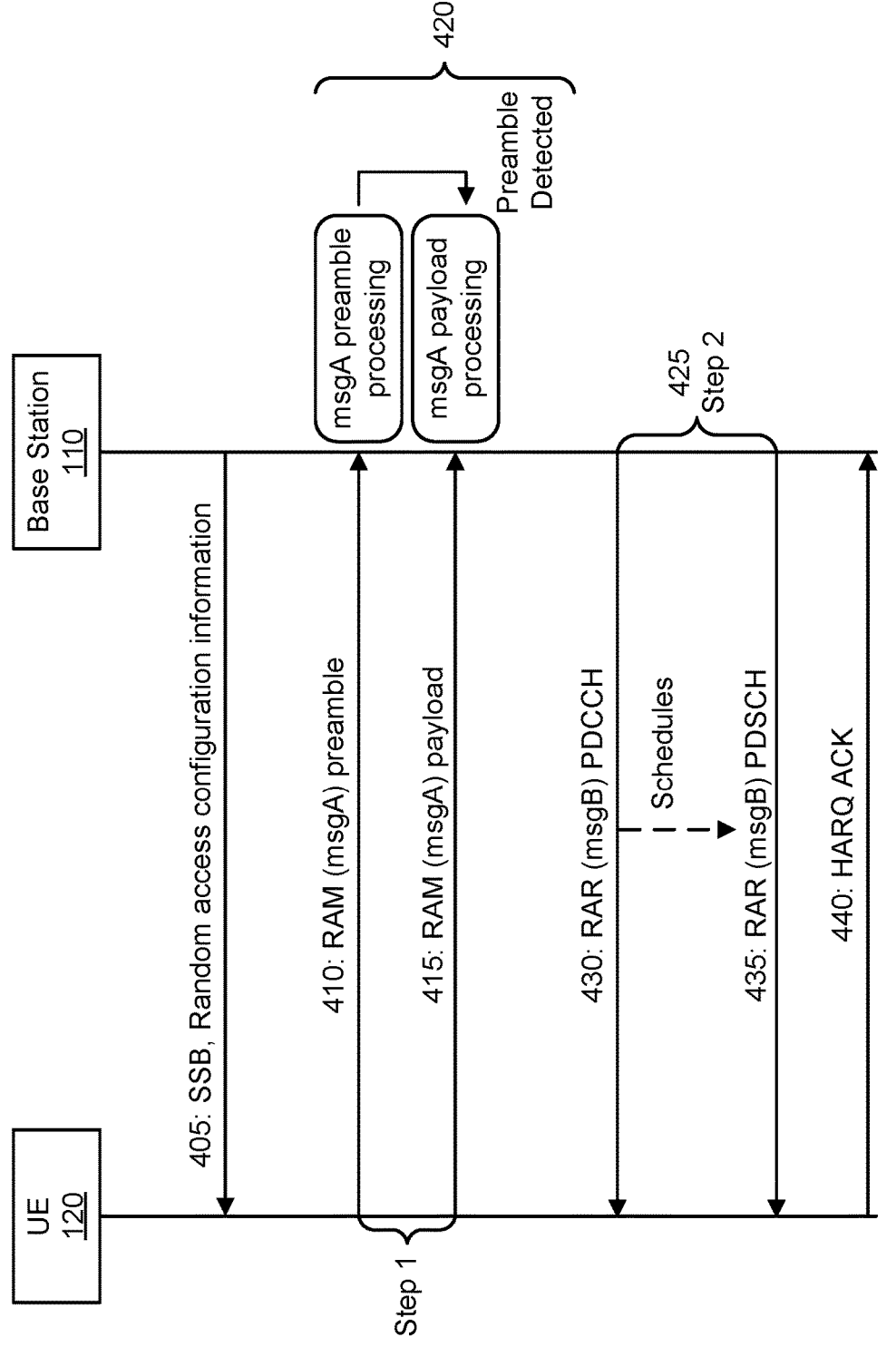
FIG. 4 is a diagram illustrating an example of a two-step random access procedure, in accordance with the present disclosure.

FIG. 4 is a diagram illustrating an example 400 of a two-step random access procedure, in accordance with the present disclosure. As shown in FIG. 4, a base station 110 and a UE 120 may communicate with one another to perform the two-step random access procedure (e.g., a two-step RACH procedure).

As shown by reference number 405, the base station 110 may transmit, and the UE 120 may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 410, the UE 120 may transmit, and the base station 110 may receive, a RAM preamble. As shown by reference number 415, the UE 120 may transmit, and the base station 110 may receive, a RAM payload. In some aspects, the UE 120 may transmit the RAM preamble and the RAM payload to the base station 110 in a RACH occasion indicated by, or associated with, an SSB transmitted by the base station 110. "RACH occasion" may refer to a set of resources (e.g., frequency resources and/or time resources) and/or a transmission opportunity for the UE 120 associated with a RACH procedure. As shown, the UE 120 may transmit the RAM preamble and the RAM payload to the base station 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a physical random access channel (PRACH) preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown by reference number 420, the base station 110 may receive the RAM preamble transmitted by the UE 120. If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 430, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 435, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 440, if the UE 120 successfully receives the RAR, the UE 120 may transmit a hybrid automatic repeat request (HARQ) acknowledgement (ACK).

As indicated above, FIG. 4 is provided as an example. Other examples may differ from what is described with regard to FIG. 4.

Figure 5:
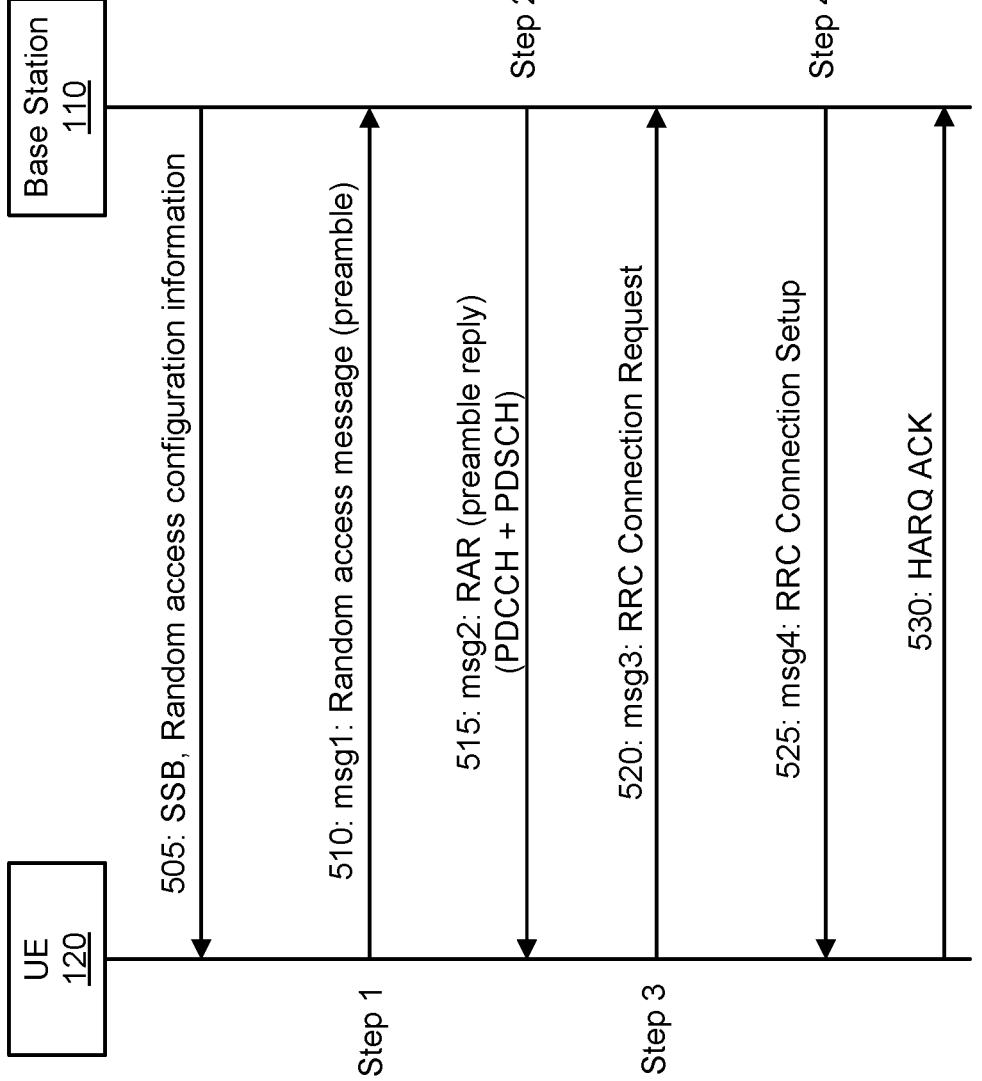
FIG. 5 is a diagram illustrating an example of a four-step random access procedure, in accordance with the present disclosure.

FIG. 5 is a diagram illustrating an example 500 of a four-step random access procedure, in accordance with the present disclosure. As shown in FIG. 5, a base station 110 and a UE 120 may communicate with one another to perform the four-step random access procedure.

As shown by reference number 505, the base station 110 may transmit, and the UE 120 may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 510, the UE 120 may transmit a RAM, which may include a preamble (sometimes referred to as a random access preamble, a PRACH preamble, or a RAM preamble). In some aspects, the UE 120 may transmit the RAM to the base station 110 in a RACH occasion indicated by, or associated with, an SSB transmitted by the base station 110. The message that includes the preamble may be referred to as a message 1, msg1, MSG1, a first message, or an initial message in a four-step random access procedure. The random access message may include a random access preamble identifier.

As shown by reference number 515, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 520, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 525, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 530, if the UE 120 successfully receives the RRC connection setup message, the UE 120 may transmit a HARQ ACK.

As indicated above, FIG. 5 is provided as an example. Other examples may differ from what is described with regard to FIG. 5.

Figure 6A:
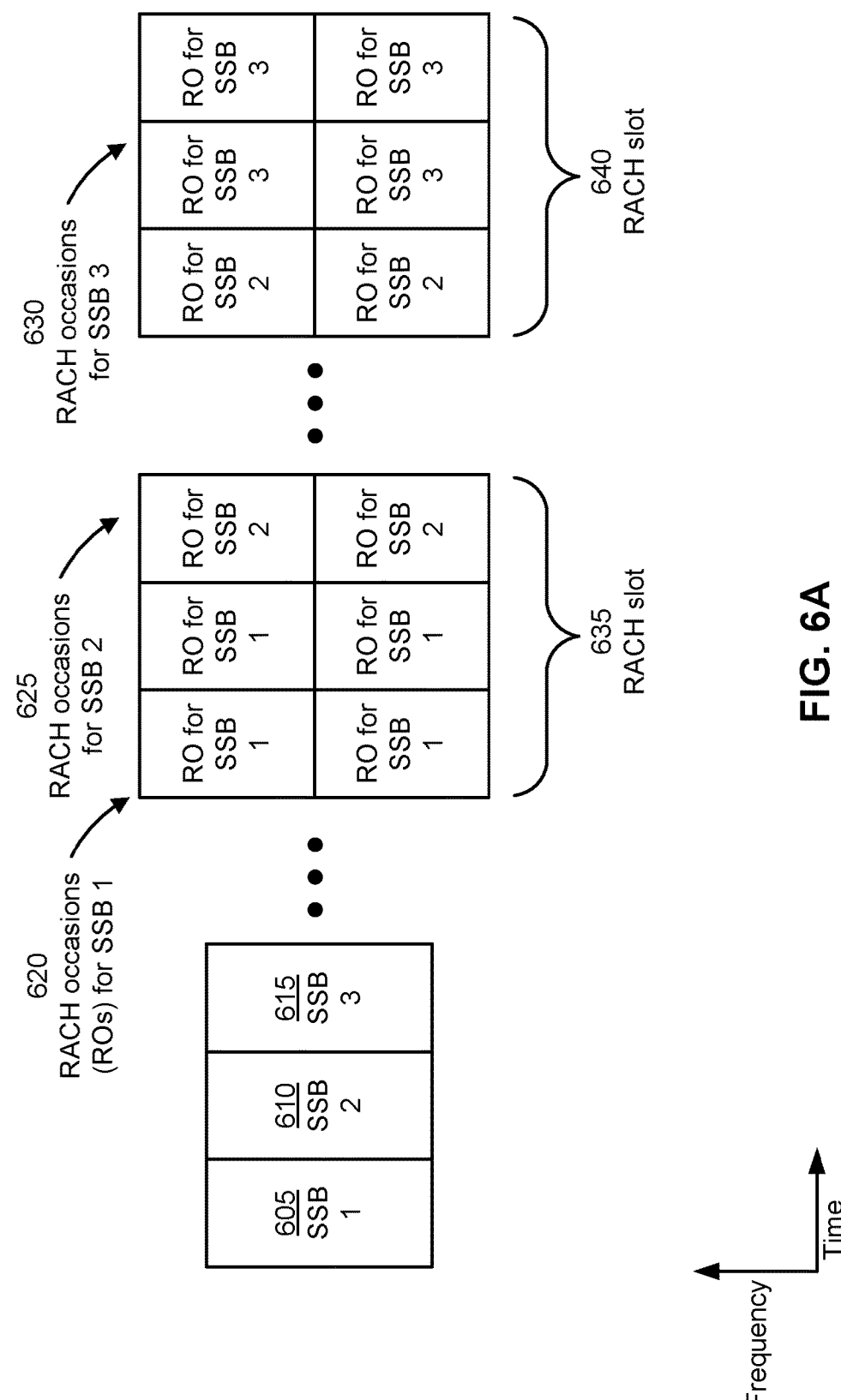

FIGS. 6A and 6B are diagrams illustrating an example 600 of SSB to RACH occasion association, in accordance with the present disclosure. As described above, a UE 120 may transmit a PRACH message (e.g., a msgA and/or a msg1) using a RACH occasion. The RACH occasion may be a set of time domain and frequency domain resources that are available for the UE 120 to transmit the PRACH message. RACH occasions may be mapped to SSBs (e.g., to SSB indexes) to enable a base station 110 to associate preambles included in a PRACH transmission (e.g., transmitted in a RACH occasion) to SSB beams. The base station 110 may signal, to the UE 120, an SSB to RACH occasion association or mapping in an SIB, such as SIB 1 (e.g., SIB 1 as defined, or otherwise fixed, by the 3GPP).

For example, as shown in FIG. 6A, the base station 110 may transmit a first SSB 605 (e.g., SSB 1) using a first beam, may transmit a second SSB 610 (e.g., SSB 2) using a second beam, and/or may transmit a third SSB 615 (e.g., SSB 3) using a third beam. As shown by reference number 620, a first set (e.g., one or more) of RACH occasions (ROs) may be mapped to, or associated with, the first SSB 605 (e.g., may be mapped to, or associated with, an index of the first SSB 605). As shown by reference number 625, a second set (e.g., one or more) of RACH occasions may be mapped to, or associated with, the second SSB 610 (e.g., may be mapped to, or associated with, an index of the second SSB 610). As shown by reference number 630, a third set (e.g., one or more) of RACH occasions may be mapped to, or associated with, the third SSB 615 (e.g., may be mapped to, or associated with, an index of the third SSB 615).

As shown by reference numbers 635 and 640, multiple RACH occasions may be configured in a single RACH slot (e.g., a time slot associated with RACH transmission opportunities). For example, as shown by reference number 635, four RACH occasions associated with the first SSB 605 and two RACH occasions associated with the second SSB 610 may be included in a first RACH slot. As shown by reference number 640, two RACH occasions associated with the second SSB 610 and four RACH occasions associated with the third SSB 615 may be included in a second RACH slot. Each SSB transmitted by the base station 110 may be associated with a set (e.g., the same number) of RACH occasions. For example, as shown in FIG. 6A, each SSB may be associated with four RACH occasions (e.g., a one SSB to four RACH occasions association or mapping). In some aspects, each SSB may be associated with a different number of RACH occasions, such as one, two, six, eight, and/or sixteen, among other examples.

In some aspects, a single RACH occasion may be associated with more than one SSB (e.g., more than one SSB index). In that case, the SSBs may be mapped to the RACH occasions first in the code domain. For example, a first SSB may be mapped to the RACH occasion and associated with a first sequence (e.g., a Zadoff-Chu sequence, a pseudo-noise sequence, and/or an orthogonal cover code) and a second SSB may be mapped to the RACH occasion and associated with a second sequence (e.g., to enable the base station 110 to identify the SSB beam by the sequence used to transmit the PRACH transmission in the RACH occasion).

In some aspects, for a mapping cycle or an association period, RACH occasions may be mapped consecutively to corresponding SSB indexes. SSB indexes may be mapped first in increasing order of preamble indexes within a single RACH occasion in the code domain (e.g., where multiple SSBs are to be mapped to a single RACH occasion), second in increasing order of frequency resource indexes for frequency multiplexed RACH occasions, third in increasing order of time resource indexes for time multiplexed RACH occasions within a RACH slot, and fourth in increased order of indexes for RACH slots.

The UE 120 may receive an SSB (e.g., the first SSB 605, the second SSB 610, and/or the third SSB 615) and may determine that the SSB is an acceptable SSB to initiate a RACH procedure (e.g., based on a measurement of the SSB beam). The UE 120 may select a RACH occasion mapped to, or associated with, the SSB (e.g., the SSB index). Where the SSB is mapped to, or associated with, more than one RACH occasion, the UE 120 may randomly select a RACH occasion with equal probability among the multiple RACH occasions mapped to, or associated with, the SSB. The UE 120 may use the selected RACH occasion to transmit a PRACH message (e.g., a msgA and/or a msg1) to initiate a RACH procedure with the base station 110.

As shown in FIG. 6B, the base station 110 may be required to switch between different beams for different RACH occasions. For example, as described above, a first RACH occasion 645 may be associated with a first SSB (e.g., the first SSB 605) and a first beam. A second RACH occasion 650 may be associated with a second SSB (e.g., the second SSB 610) and a second beam. As shown in FIG. 6B, each of the first RACH occasion 645 and the second RACH occasion 650 include a guard period. The guard period represents a time domain guard period that is included (e.g., at the end of the time domain resource allocation associated with a RACH occasion and/or after a time domain resource allocation of a symbol) to allow for signals from different UEs to arrive at the base station 110 at different times without inter-symbol interference between the adjacent symbols of the two different RACH occasions. During the guard period, the base station 110 is capable of monitoring and/or receiving signals, as the base station 110 may receive RACH messages from different UEs at different times. Although the example of FIG. 6B is discussed in the context of a first RACH occasion 645 being associated with a first beam and the second RACH occasion 650 being associated with a second beam, more generally, a guard period is placed at the end of any RACH occasion, whether the subsequent RACH occasion is on a same beam or a different beam. In a case where the first RACH occasion 645 is associated with a first beam and the second RACH occasion 650 is associated with a second beam, it is understood that the base station 110 may be required to switch between communicating, or monitoring for communications, using the first beam, to communicating, or monitoring for communications, using the second beam when transitioning from the first RACH occasion 645 to the second RACH occasion 650. As shown in FIG. 6B, a RACH message transmitted using a RACH occasion may include a cyclic prefix (CP). As shown in FIG. 6B, in addition to the guard period, a CP may be used for a communication to further avoid inter-symbol interference (ISI) between adjacent OFDM symbols in multipath channel environments and also to simplify frequency domain processing. A CP may be a time domain guard period that is placed at the start of a RACH occasion. In some cases, a CP may be referred to as a guard interval (GI), or a GI may be used instead of a CP. As shown by reference number 655, when the CP duration is longer than the time needed for beam switching, an amount of time required for the base station 110 to switch beams (e.g., from the first beam to the second beam) may be absorbed by a CP. Therefore, a communication performance of the RACH messages may not be impacted as the base station 110 may be enabled to switch beams during the time associated with the CP and receive the symbols associated with the RACH message on the second beam (e.g., during the second RACH occasion 650).

As indicated above, FIGS. 6A and 6B are provided as examples. Other examples may differ from what is described with regard to FIGS. 6A and 6B.

Some communication systems may use a single-carrier (SC) waveform in order to reduce peak-to-average power ratio (PAPR), which reduces the required power amplifier (PA) back-off for transmission of the waveform. A lower PA back off leads to improved transmission performance and improves utilization of transmit power budget. Examples of SC waveforms include DFT-S-OFDM waveforms and SC quadrature amplitude modulation (SC-QAM) waveforms.

Some NR frequency bands may operate using an OFDM waveform for downlink communications and may operate using either the OFDM waveform or an SC waveform for uplink communications. The OFDM waveform may use a CP, and in such cases may be referred to as a CP-OFDM waveform. The OFDM waveform may provide a relatively high signal-to-noise ratio (SNR), a relatively high spectral efficiency, and/or a relatively high order single user and/or multi-user MIMO (e.g., as compared to the SC waveform). An SC waveform may provide a relatively low PAPR for better coverage and/or a relatively low complexity for reception and transmission (e.g., as compared to the OFDM waveform). The SC waveform may include, for example, a single carrier time domain (SC-TD) waveform (e.g., an SC-QAM waveform) or a single carrier frequency domain (SC-FD) waveform (e.g., a DFT-s-OFDM waveform).

NR may include other frequency ranges in which an SC waveform may also be used for downlink communications to improve PAPR and reduce complexity. The SC waveform may include an SC-TD waveform or an SC-FD waveform to achieve different performance tradeoffs. For example, single carrier waveforms may provide a low PAPR, thereby improving wireless communication performance and coverage.

However, single carrier waveforms may not provide support for MIMO operations and/or frequency division multiplex (FDM) operations. For example, an SC-QAM waveform may provide a reduced complexity, as compared to a frequency domain implementation waveform, such as DFT-s-OFDM waveforms and/or OFDM waveforms, as fast Fourier transform (FFT) and inverse FFT (iFFT) operations may not be required. However, an SC-QAM waveform may be suboptimal for FDM operations and/or MIMO operations. Frequency domain implementation waveforms, such as DFT-s-OFDM waveforms and/or OFDM waveforms, may provide efficient bandwidth utilization as guard bands (e.g., a range of frequency resources that are not used) may not be required between bandwidth parts, for example. Additionally, frequency domain equalization may provide a lower complexity than time domain equalization (e.g., that may be required for time domain implementation waveforms, such as SC-QAM waveforms). In some cases, an OFDM waveform may be associated with higher PAPR and/or a high SNR. Additionally, the OFDM waveform may be associated with higher spectral efficiency and/or may support a higher order MIMO operation. As a result, an OFDM waveform may be capable of supporting high data rates.

Therefore, in some wireless networks, different types of waveforms may be used by UEs and/or base stations. As described above, SC waveforms may be used in some higher band operations. SC waveforms may be time division multiplex (TDM) based waveforms as FDM operations may be difficult or complex to perform for SC waveforms as compared to OFDM waveforms. As a result, a UE and/or a base station that is communicating using an SC waveform may be unable to use an SSB to RACH occasion mapping or associations that include RACH occasions that are frequency division multiplexed.

Moreover, for wireless communication in higher frequency bands, a larger subcarrier spacing (SCS) (e.g., 960 kHz, 1.92 MHz, and/or 3.84 MHz) may be used as compared to lower frequency bands (such as FR 1 and FR 2, which may use an SCS of 15 kHz, 30 kHz, 60 kHz, 120 kHz, and/or 240 kHz). The larger SCS may be needed in higher frequency bands to support a larger bandwidth with the same fast Fourier transform (FFT) size as lower frequency bands. However, as a size of the SCS increases, a CP duration and a symbol duration may decrease proportionally (e.g., as a duration of a CP may be 1/SCS). Accordingly, although the short PRACH preamble formats can generally be proportionately scaled according to the subcarrier spacing (e.g., where a larger subcarrier spacing generally leads to a shorter symbol duration), scaling at the larger SCSs expected to be used in higher frequency bands may significantly reduce the cyclic prefix duration and therefore the supportable cell size. For example, for an SCS of 960 kHz, a CP duration may be 73.2 nanoseconds and a symbol duration may be 1041.7 nanoseconds. As described above, in some cases, a base station may be required to switch beams between a first RACH occasion and a second RACH occasion. As noted above, typically, the beam switch time (e.g., the amount of time required for the base station to switch beams) can be absorbed in the CP duration (e.g., for smaller SCS sizes). However, in higher bands with larger SCS (e.g., 960 kHz and/or above), the CP duration may not provide enough time to absorb the beam switch time of the base station. As a result, the beam switch time may extend into a symbol of a signal (e.g., of a RACH message), resulting in the base station not receiving some, or all, data carried by the signal. Therefore, the SSB to RACH association mapping may be insufficient in higher bands and/or with different waveform types (e.g., with SC waveforms), as described above. Furthermore, during the guard period that often buffers RACH occasions, as shown above, the base station typically continues to monitor and/or receive signals from UEs. As such, a base station cannot switch beams during the guard period as the base station may still be receiving signals from various UEs during the guard period.

Some techniques and apparatuses described herein enable downlink initial access signal (IAS) to RACH occasion association that addresses one or more (or all) of the problems associated with SSB to RACH occasion mappings in higher bands and/or with different waveform types described above. For example, a base station may configure a UE with a downlink IAS to RACH occasion association pattern, wherein the downlink IAS to RACH occasion association pattern indicates switching gaps between downlink IAS occasions (e.g., SSBs, another IAS, and/or a combination of signals associated with initial access) and between RACH occasions (e.g., to accommodate beam switching times and/or downlink/uplink switching times) and/or frequency domain guard bands between RACH occasions (e.g., to enable an SC waveform to use RACH occasions that are FDM). The switching gap can reflect a time gap during which the base station does not monitor and/or receive any signals to enable the base station to switch from one beam (having a first direction) to another beam (having a second direction) and/or to switch from an uplink beam to a downlink beam, or vice versa. In some aspects, the downlink IAS to RACH occasion association pattern may be mapped in the time domain only (e.g., may not be mapped in the frequency domain) to account for SC waveforms that may be used to communicate using a RACH occasion. In some aspects, the downlink IAS to RACH occasion association pattern may group or cluster downlink IAS for different beams together and may group or cluster RACH occasions for different beams together. In some aspects, the downlink IAS to RACH occasion association pattern may group or cluster a downlink IAS and RACH occasion(s) associated with the same beam together. As a result, the downlink IAS to RACH occasion association pattern may account for larger SCS and/or shorter CP durations in higher bands by including one or more switching gaps (e.g., beam switching gaps and/or downlink/uplink switching gaps) between downlink IASs and/or between RACH occasions. Additionally, or alternatively, the downlink IAS to RACH occasion association pattern may account for different waveform types, such as SC waveforms, that may be used in higher frequency bands by mapping the downlink IAS to RACH occasion association pattern in the time domain only and/or by including guard bands between FDM RACH occasions included in the downlink IAS to RACH occasion association pattern.

Figure 7:
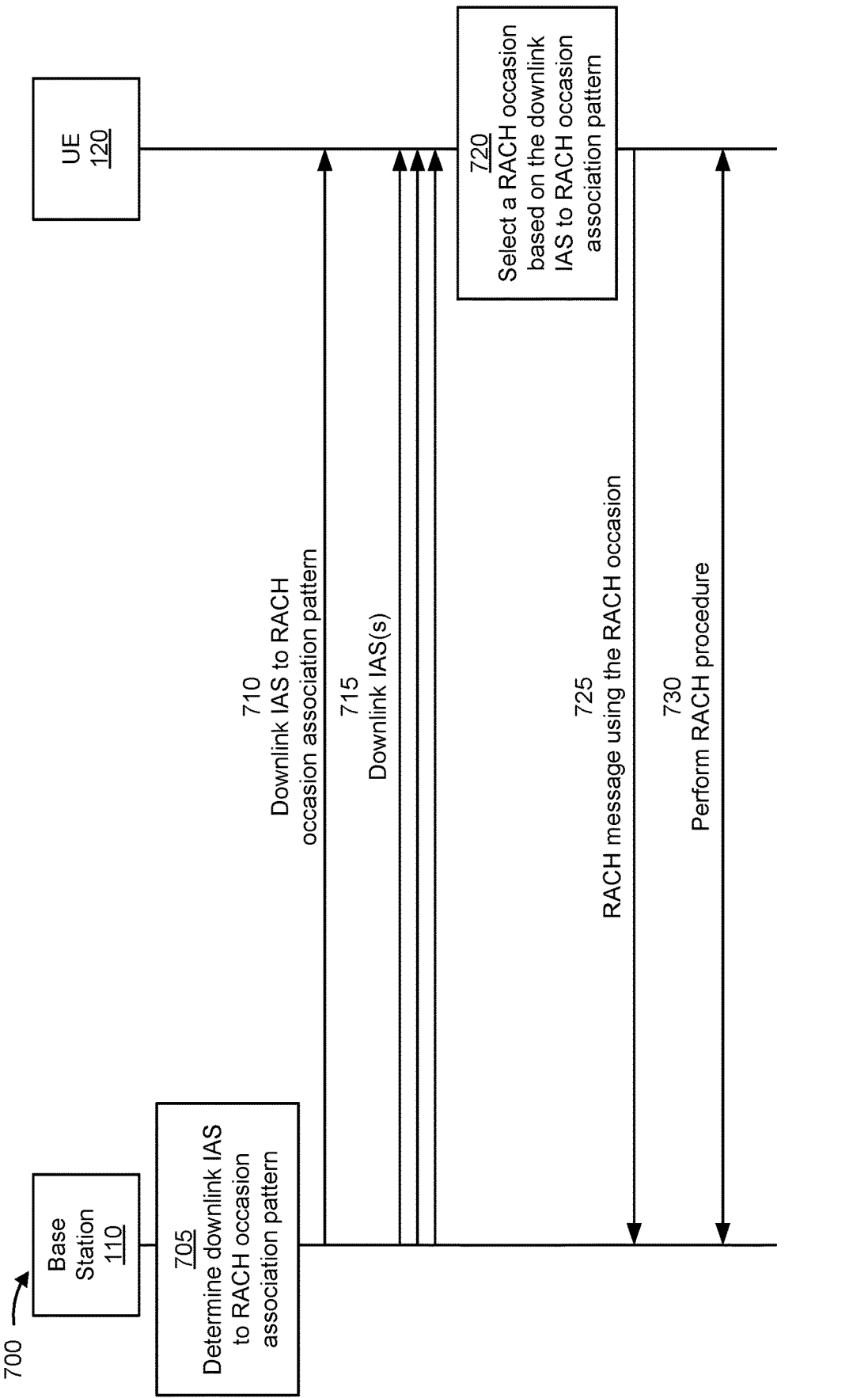
FIGS. 7-11 are diagram illustrating examples associated with downlink initial access signal (IAS) to RACH occasion association, in accordance with the present disclosure.

FIG. 7 is a diagram illustrating an example 700 associated with downlink IAS to RACH occasion association, in accordance with the present disclosure. As shown in FIG. 7, a base station 110 and a UE 120 may communicate with one another in a wireless network, such as wireless network 100.

As described above, the base station 110 may transmit one or more downlink IASs to enable the UE 120 to establish a connection with the base station 110. "Downlink IAS" or "DL IAS" may refer to a signal, or combination of signals, that enables a UE (e.g., the UE 120) or another device to establish a connection with a base station (e.g., the base station 110). For example, a downlink IAS may include an SSB, a control resource set (CORESET) signal, a downlink control information (DCI) signal, an SIB signal, and/or any combination thereof, among other examples. For example, a downlink IAS may be a combination of an SSB signal and a CORESET signal (e.g., an SSB and a CORESET 0 signal, as defined, or otherwise fixed, by the 3GPP). In some aspects, a downlink IAS may be a combination of an SSB signal and a DCI signal (e.g., an SSB and a DCI 1_0 signal, as defined, or otherwise fixed, by the 3GPP). In some aspects, a downlink IAS may be a combination of an SSB signal, a CORESET 0 signal, a DCI 1_0 signal, and/or an SIB signal (e.g., an SIB 1 signal, as defined, or otherwise fixed, by the 3GPP). The combinations of signals described above are provided as examples and a downlink IAS may include any combination of signals transmitted by the base station 110 that may enable a UE or another device to establish a connection with the base station 110.

As shown by reference number 705, the base station 110 may determine a downlink IAS to RACH occasion association pattern to be associated with the base station 110 and the UE 120 (and/or a group of UEs that includes the UE 120). In some aspects, the downlink IAS to RACH occasion association pattern may be used by the base station 110 (e.g., and one or more UEs, such as the UE 120) for higher frequency bands (e.g., millimeter wave bands) and/or for operating frequencies having a high SCS (e.g., 960 kHz and/or above), among other examples.

In some aspects, the base station 110 may determine that the downlink IAS to RACH occasion association pattern may be a first pattern that includes a group of downlink IAS occasions (e.g., transmission opportunities for a downlink IAS signal) for different beams associated with the base station 110 and a group of RACH occasions associated with the group of downlink IAS occasions, where the group of downlink IAS occasions are grouped together in the time domain and the group of RACH occasions are grouped together in the time domain. The first pattern may include switching gaps (e.g., beam switching gaps) between each downlink IAS occasion and/or between each RACH occasion. The first pattern is depicted and described in more detail below in connection with FIG. 8 and reference numbers 805 and 810.

In some aspects, the base station 110 may determine that the downlink IAS to RACH occasion association pattern may be a second pattern that includes a downlink IAS associated with a beam grouped with a RACH occasion associated with the beam (e.g., and the downlink IAS) in the time domain. In some aspects, the second pattern may include the downlink IAS and the RACH occasion being multiplexed in the time domain and/or the frequency domain. In some aspects, the second pattern may include a downlink/uplink switching gap between the downlink IAS and the RACH occasion. "Downlink/uplink switching gap" may refer to an amount of time required for the base station 110 to switch from transmitting downlink communications to receiving uplink communications, or from receiving uplink communications to transmitting downlink communications. The second pattern is depicted and described in more detail below in connection with FIG. 8 and reference numbers 815 and 820.

In some aspects, the base station 110 may determine that the downlink IAS to RACH occasion association pattern includes guard bands between downlink IASs and/or between RACH occasions. As described above, a guard band may be one or more frequency resources (e.g., one or more resource elements (REs) that are not allocated for any signal (e.g., that are intentionally not used by the UE 120 and/or the base station 110 for communicating signals). The downlink IAS to RACH occasion association pattern may include a first RACH occasion frequency division multiplexed with a second RACH occasion and a guard band included between the first RACH occasion and the second RACH occasion in the frequency domain. In some aspects, the base station 110 may determine that guard bands are to be included in the downlink IAS to RACH occasion association pattern when frequency division multiplexing is used and when a waveform type used is an SC waveform (e.g., the SC-QAM waveform type). For example, the base station 110 may perform filtering and apply SC processing in each RACH occasion (e.g., where the frequency resources allocated for the RACH occasion may serve as a sub-band). For example, each RACH occasion may be sent using X MHz, where the base station 110 supports Y MHz for initial access procedures (e.g., where Y is larger than X). The guard band may enable the filtering to be performed for each RACH occasion without causing interference between the frequency division multiplexed RACH occasions where an SC waveform type is used.

In some aspects, the base station 110 may determine whether to use the first pattern or the second pattern for the downlink IAS to RACH occasion association pattern. For example, the base station 110 may determine whether to use the first pattern or the second pattern based at least in part on a length of a downlink to uplink switching time of the base station 110, a length of a beam switching time of the base station 110, a number of downlink IAS occasions associated with the downlink IAS to RACH occasion association pattern, and/or an amount of time associated with channel acquisition for the UE 120. For example, switching gaps associated with the first pattern may be associated with beam switching, whereas switching gaps associated with the second pattern may be associated with downlink/uplink switching. Therefore, in some aspects, if the length of the downlink to uplink switching time of the base station 110 is less than the length of a beam switching time of the base station 110, then the base station 110 may determine to use the second pattern, as the duration of the downlink/uplink switch gaps may be less than a duration of the beam switching gaps (e.g., of the first pattern). As a result, the base station 110 may reduce a required switching gap overhead associated with the downlink IAS to RACH occasion association pattern, thereby conserving resources and reducing a latency associated with a RACH procedure. Alternatively, if the length of the downlink to uplink switching time of the base station 110 is greater than the length of a beam switching time of the base station 110, then the base station 110 may determine to use the first pattern, as the duration of the downlink/uplink switch gaps may be greater than the duration of the beam switching gaps.

As another example, if an amount of time associated with channel acquisition for the UE 120 (e.g., a time limit associated with channel acquisition of the UE 120) is below a threshold, then the base station 110 may determine to use the first pattern as the downlink IAS to RACH occasion association pattern. For example, the second pattern may be associated with an increased UE channel acquisition time, as an amount of time between downlink IASs transmitted by the base station 110 may be increased as compared to the first pattern (e.g., as described in more detail below in connection with FIG. 8). Therefore, if the UE 120 is required to acquire the channel (e.g., with the base station) quickly (e.g., if a time limit associated with channel acquisition of the UE 120 is below a threshold), then the base station 110 may determine to use the first pattern to reduce the UE channel acquisition time.

In some aspects, the base station 110 may determine that an ordering of RACH occasions may be varied between association periods. "Association period" may refer to a period of time that a mapping between downlink IASs and RACH occasions is valid or applicable. The downlink IAS to RACH occasion association pattern may include one or more association periods. The base station 110 may determine that the downlink IAS to RACH occasion association pattern includes a first order of RACH occasions in the time domain for a first association period and a second order of RACH occasions in the time domain for a second association period. This may reduce a latency associated with channel acquisition for the UE 120. For example, if the order of the RACH occasions remained the same for each association period, some RACH occasions may continually occur later in time than other RACH occasions. Therefore, if the UE 120 is to use a RACH occasion that occurs later in time, then an amount of time for the UE 120 to acquire the channel may be increased. However, if the order of the RACH occasions is varied for each association period, then the UE 120 may be enabled to acquire the channel in a shorter amount of time (e.g., during an associated period where the RACH occasion occurs earlier in time as compared to a different association period). As a result, a latency for different RACH occasions may be varied or balanced among different association periods. This may enable some UEs (e.g., that require RACH occasions that would have otherwise always occurred later in time) to decrease a latency associated with channel acquisition. The varied ordering of RACH occasions between association periods is depicted and described in more detail below in connection with FIG. 9.

In some aspects, the base station 110 may determine that the downlink IAS to RACH occasion association pattern includes an unbalanced or non-uniform distribution of a number of RACH occasions mapped to each downlink IAS. For example, the downlink IAS to RACH occasion association pattern may include a first downlink IAS associated with a first number of RACH occasions and a second downlink IAS associated with a second number of RACH occasions (e.g., that is different than the first number of RACH occasions). For example, the first downlink IAS may be associated with more RACH occasions than the second downlink IAS. For example, a beam associated with the first downlink IAS may be associated with a spatial direction towards an area with a higher concentration of UEs than an area associated with a spatial direction of a beam associated with the second downlink IAS. Therefore, the downlink IAS to RACH occasion association pattern may include more RACH occasions associated with the first downlink IAS to increase channel access opportunities for UEs in the area with the higher concentration of UEs. The downlink IAS to RACH occasion association pattern with unbalanced or non-uniform distribution of a number of RACH occasions mapped to each downlink IAS is depicted and described in more detail below in connection with FIG. 10.

As described above, the downlink IAS to RACH occasion association pattern may include switching gaps between downlink IASs and/or between RACH occasions to enable the base station 110 and/or the UE 120 to perform switching (e.g., beam switching and/or downlink/uplink switching) In some aspects, the switching gaps may be explicit switching gaps. For example, a downlink IAS to RACH occasion association pattern may include one or more time domain resources (e.g., that are unused or not allocated for a signal or RACH occasion) between a first RACH occasion and a second RACH occasion that occurs directly after the first RACH occasion. In some aspects, the switching gaps may include a switching gap included in a CP of a RACH message transmitted using a RACH occasion (e.g., a switching gap that occurs at the start of a RACH occasion, such as during the CP). In some aspects, the switching gaps may be extended guard period switching gaps and/or extended CP switching gaps. An extended guard period switching gap or extended CP switching gap may be associated with a RACH message (or RACH occasion) that includes a guard period or CP that is extended to absorb the switching time. Therefore, the base station 110 may perform switching during the extended guard period or CP. As discussed above, as typically understood, the guard period is a period where the base station may continue to monitor and/or receive signals from different UEs. However, here, where the switching gap may be included in the guard period, it is understood that the guard period may therefore include a time where the base station continues to monitor and/or receive signals from different UEs and also a time where the base station does not monitor and/or receive signals to enable the base station to switch between different beams and/or switch between an uplink beam and a downlink beam. Similarly, for an extended CP switching gap, the base station may not monitor and/or receive signals during part of the CP when it is switching beams and may monitor and/or receive during another part of the CP. In some aspects, the switching gaps may be sub-symbol switching gaps, such as when a DFT-s-OFDM waveform is used. A sub-symbol switching gap may be associated with a RACH message that includes a tail symbol (e.g., one or more low energy samples included in the symbol of the RACH message). The tail symbol may serve as an additional guard period, thereby enabling the base station 110 to initiate a switch during the original or configured guard period. The different types of switching gaps are depicted and described in more detail below in connection with FIG. 11.

As shown by reference number 710, the base station 110 may transmit, and the UE 120 may receive, configuration information (e.g., random access configuration information) indicating the downlink IAS to RACH occasion association pattern. For example, the base station 110 may transmit, and the UE 120 may receive, an indication of the downlink IAS to RACH occasion association pattern indicating switching gaps between downlink IAS occasions and between RACH occasions, guard bands between RACH occasions, the first pattern, the second pattern, a varied ordering of RACH occasions between association periods, an unbalanced or non-uniform distribution of a number of RACH occasions mapped to each downlink IAS, and/or a type of switching gap, among other examples. In some aspects, the base station 110 may transmit the configuration information indicating the downlink IAS to RACH occasion association pattern in an SIB, such as SIB 1.

As shown by reference number 715, the base station 110 may transmit, and the UE 120 may receive, one or more downlink IASs. For example, the base station 110 may transmit one or more SSBs. The base station 110 may be enabled to perform beam switching and/or downlink/uplink switching while transmitting the one or more downlink IASs based at least in part on the downlink IAS to RACH occasion association pattern. For example, the switching gaps included in the downlink IAS to RACH occasion association pattern may enable the base station 110 to perform beam switching and/or downlink/uplink switching while transmitting the one or more downlink IASs.

The UE 120 may monitor for and receive one or more downlink IASs transmitted by the base station 110. The UE 120 may select a downlink IAS to be associated with a RACH procedure based at least in part on receiving the one or more downlink IASs transmitted by the base station 110. For example, the UE 120 may measure a beam associated with the one or more downlink IASs to identify an acceptable beam (e.g., a beam having a measurement value that satisfies a threshold) for communications between the UE 120 and the base station 110.

As shown by reference number 720, the UE 120 may select a RACH occasion to transmit a RACH message based at least in part on (e.g., according to) the downlink IAS to RACH occasion association pattern. For example, the UE 120 may identify one or more RACH occasions associated with the downlink IAS received by the UE 120 as described above. The UE 120 may select a RACH occasion (e.g., randomly) from the one or more RACH occasions associated with the downlink IAS.

As shown by reference number 725, the UE 120 may transmit, and the base station 110 may receive, a RACH message (e.g., a msgA and/or a msg1) using a RACH occasion according to the downlink IAS to RACH occasion association pattern. For example, the UE 120 may receive an indication of the downlink IAS to RACH occasion association pattern, receive a downlink IAS, select a RACH occasions according to the downlink IAS to RACH occasion association pattern, and transmit a RACH message using the selected RACH occasion. The base station 110 may identify a downlink IAS and/or a beam associated with the RACH message based at least in part on the downlink IAS to RACH occasion association pattern. As shown by reference number 730, the base station 110 and the UE 120 may perform a RACH procedure (e.g., a two-step RACH procedure as described above in connection with FIG. 4 or a four-step RACH procedure as described above in connection with FIG. 5) based at least in part on the UE 120 transmitting, and the base station 110 receiving, the RACH message using the RACH occasion.

As a result, the downlink IAS to RACH occasion association pattern may account for larger SCS and/or shorter CP durations in higher bands by including one or more switching gaps (e.g., beam switching gaps and/or downlink/uplink switching gaps) between downlink IASs and/or between RACH occasions. Additionally, or alternatively, the downlink IAS to RACH occasion association pattern may account for different waveform types, such as SC waveforms, that may be used in higher frequency bands by mapping the downlink IAS to RACH occasion association pattern in the time domain only and/or by including guard bands between FDM RACH occasions included in the downlink IAS to RACH occasion association pattern.

As indicated above, FIG. 7 is provided as an example. Other examples may differ from what is described with respect to FIG. 7.

Figure 8:
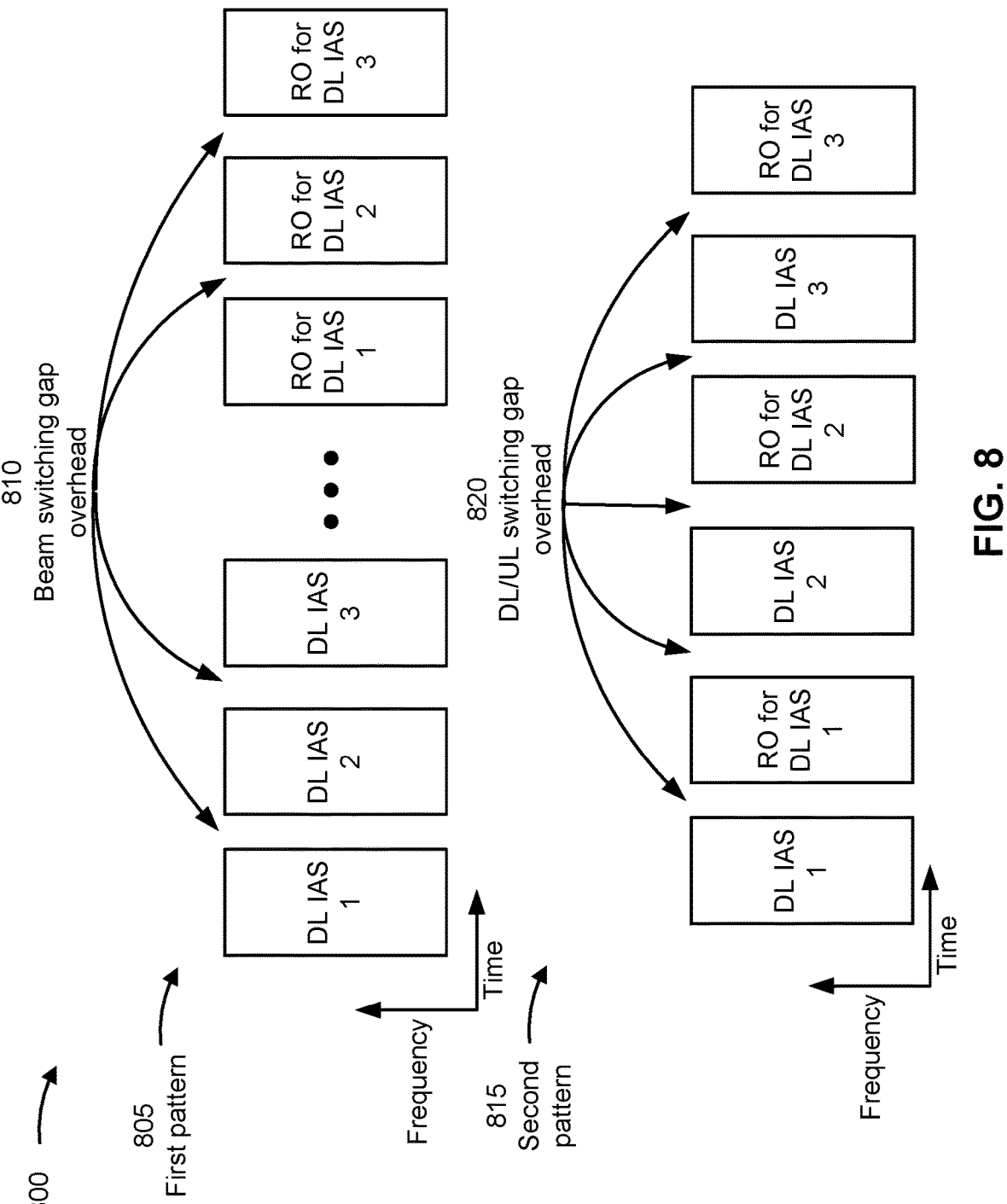

FIG. 8 is a diagram illustrating an example 800 associated with downlink IAS to RACH occasion association, in accordance with the present disclosure. FIG. 8 depicts different examples of downlink IAS to RACH occasion association patterns, as described above in connection with FIG. 7. For example, as shown by reference number 805, the downlink IAS to RACH occasion association pattern may be the first pattern described above in connection with FIG. 7. As shown by reference number 815, the downlink IAS to RACH occasion association pattern may be the second pattern described above in connection with FIG. 7. In some aspects, a base station 110 may determine whether to use the first pattern or the second pattern for the downlink IAS to RACH occasion association pattern, as described herein.

As shown by reference number 805, the first pattern may include downlink (DL) IAS signals grouped together in the time domain and RACH occasions (ROs) grouped together in the time domain. For example, in accordance with the first pattern, the base station 110 may transmit a first downlink IAS (e.g., DL IAS 1) using a first beam, may transmit a second downlink IAS (e.g., DL IAS 2) using a second beam, and may transmit a third downlink IAS (e.g., DL IAS 3) using a third beam. The downlink IASs may be mapped to, or associated with, RACH occasions, as described above. In some aspects, the downlink IASs may be mapped to, or associated with, RACH occasions only in the time domain (e.g., not in the frequency domain). In other words, the RACH occasions may be time division multiplexed with one another, but not frequency division multiplexed. In some aspects, the downlink IASs may be mapped to, or associated with, RACH occasions in the time domain and/or the frequency domain. In other words, the RACH occasions may be time division multiplexed and/or frequency division multiplexed with one another.

As shown by reference number 810, the downlink IAS to RACH occasion association pattern may include a beam switching gap overhead. For example, the downlink IAS to RACH occasion association pattern may include one or more opportunities for the base station 110 (and/or the UE 120) to perform beam switching. For example, as downlink IASs may be grouped together, the base station 110 may be required to switch from a first beam to a second beam when switching from the first downlink IAS to the second downlink IAS. The opportunities for the base station 110 (and/or the UE 120) to perform beam switching are depicted and described in more detail below in connection with FIG. 11.

As shown by reference number 815, the second pattern may include downlink IASs and associated RACH occasions grouped together in the time domain. For example, the second pattern may include a first downlink IAS (e.g., DL IAS 1) followed by one or more associated RACH occasions for the first downlink IAS (e.g., RO for DL IAS 1) in the time domain. As a result, a beam switching gap overhead may be reduced as the number of beam switches that are required to be performed in the second pattern is reduced (e.g., as compared to the first pattern). As shown by reference number 820, the second pattern may include a downlink/uplink (DL/UL) switching gap overhead. For example, the second pattern may include one or more opportunities for the base station 110 (and/or the UE 120) to switch between communicating downlink signals (e.g., downlink IASs) and uplink signals (e.g., RACH messages using a RACH occasion). The opportunities for the base station 110 (and/or the UE 120) to perform downlink/uplink switching are depicted and described in more detail below in connection with FIG. 11.

In some aspects, the second pattern may be used where an amount of time associated with downlink/uplink switching for a base station 110 is less than an amount of time for beam switching for the base station 110. Conversely, the first pattern may be used where the amount of time for beam switching for the base station 110 is less than the amount of time associated with downlink/uplink switching for the base station 110. Additionally, or alternatively, the first pattern may be used where a time limit for channel acquisition for a UE 120 is below a threshold. For example, the second pattern may be associated with an increased channel acquisition time as compared to the first pattern (e.g., as the downlink IASs may be transmitted later in the time domain as compared to the first pattern). For example, as shown in FIG. 8, the third downlink IAS may be transmitted earlier in the time domain in the first pattern as compared to a transmission time of the third downlink IAS in the second pattern. Therefore, if a time limit for channel acquisition for a UE 120 is below a threshold, then the base station 110 may determine that the first pattern should be used.

As indicated above, FIG. 8 is provided as an example. Other examples may differ from what is described with respect to FIG. 8.

Figure 9:
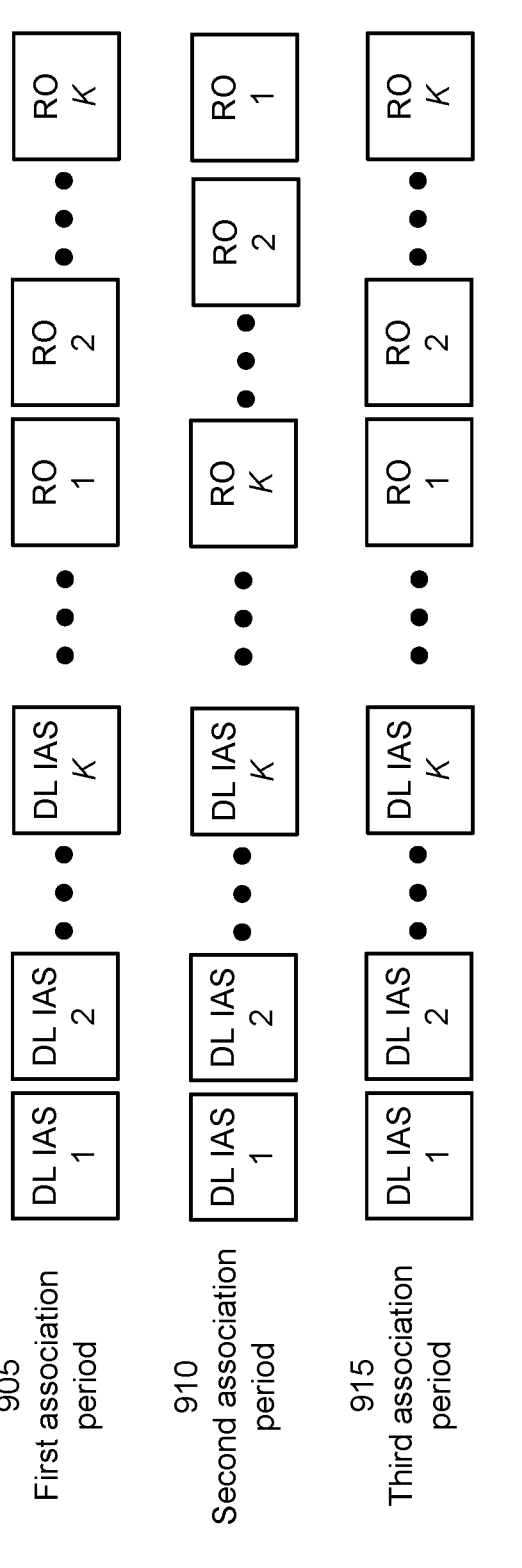

FIG. 9 is a diagram illustrating an example 900 associated with downlink IAS to RACH occasion association, in accordance with the present disclosure. FIG. 9 depicts an example of varied ordering of RACH occasions between association periods.

As described above, the downlink IAS to RACH occasion association pattern may include one or more association periods. For example, a base station 110 may transmit K downlink IASs that are mapped to, or associated with, K RACH occasions. FIG. 9 depicts a one-to-one mapping of downlink IAS to RACH occasions. However, a one-to-many (e.g., where one downlink IAS is mapped to multiple RACH occasions) mapping of downlink IAS to RACH occasion is also possible, following a similar approach as described herein (e.g., a RACH occasion depicted in FIG. 9, such as RO 1, may include multiple RACH occasions).

As shown by reference number 905, in a first association period, the RACH occasions may be ordered, in the time domain, from RACH occasions for the first downlink IAS to RACH occasions for the Kth downlink IAS. As shown by reference number 910, in a second association period, the RACH occasions may be ordered, in the time domain, from RACH occasions for the Kth downlink IAS to RACH occasions for the first downlink IAS (e.g., a different and/or reversed order as compared to the order associated with the first association period). As shown by reference number 915, in a third association period, the RACH occasions may be ordered, in the time domain, from RACH occasions for the first downlink IAS to RACH occasions for the Kth downlink IAS (e.g., the same order as the order associated with the first association period).

For example, in some aspects, the downlink IAS to RACH occasion association pattern may include a RACH ordering pattern (e.g., where an order of RACH occasions changes, or reverses, in accordance with a pattern from one association period to a next association period). In some aspects, an ordering of RACH occasions may not be from 1 to K, or from K to 1. For example, the order of RACH occasions may be random and/or may be different than following numerically from 1 to K, or from K to 1. By varying the order of RACH occasions from one association period to a next association period, a latency for channel acquisition for different downlink IAS (e.g., and for associated RACH occasions) can be balanced. For example, if a UE 120 uses RACH occasion K, then the UE 120 may have to wait until the end of the downlink IAS to RACH occasion association pattern (e.g., in the time domain) during the first association period to transmit a RACH message to initiate a RACH procedure and acquire the channel. However, during the second association period, the UE 120 may be enabled to transmit a RACH message to initiate a RACH procedure and acquire the channel earlier in the time domain due to the varied ordering of RACH occasions. As a result, a latency for channel acquisition between different downlink IASs and/or different RACH occasions can be balanced over time.

As indicated above, FIG. 9 is provided as an example. Other examples may differ from what is described with respect to FIG. 9.

Figure 10:
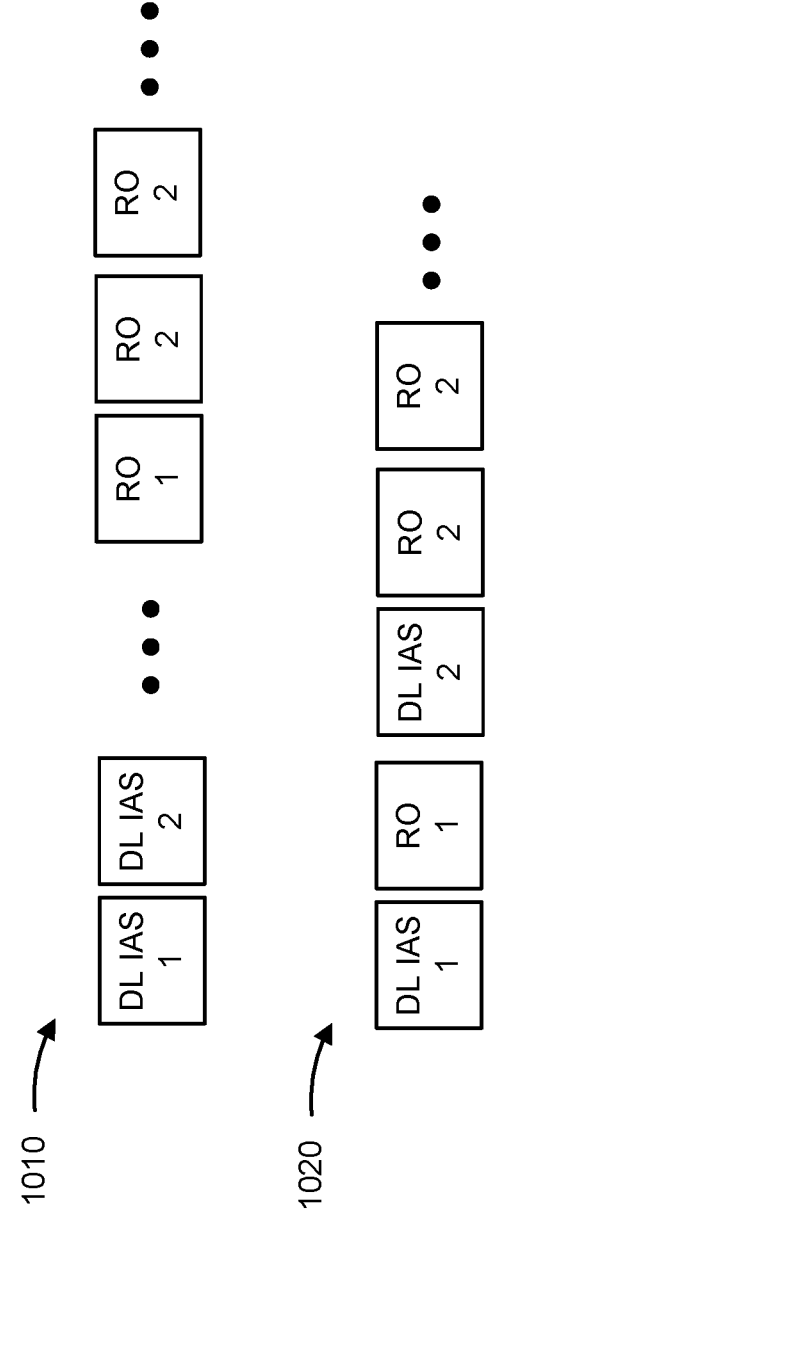

FIG. 10 is a diagram illustrating an example 1000 associated with downlink IAS to RACH occasion association, in accordance with the present disclosure. FIG. 10 depicts examples of unbalanced or non-uniform distribution of a number of RACH occasions mapped to each downlink IAS.

As described above, in some situations it may be desirable to have a downlink IAS mapped to, or associated with, more RACH occasions than another downlink IAS. For example, a downlink IAS may be associated with a beam (e.g., and therefore a spatial direction). In some aspects, the beam and/or the spatial direction may be associated with conditions that increase a difficulty to acquire the channel using the beam (e.g., and an associated RACH occasion). For example, a beam may be associated with a blockage (e.g., due to a building or other structure) or another condition may increase the difficulty to transmit messages using the beam. Therefore, it may be desirable to increase a number of RACH occasions associated with that beam (e.g., and the downlink IAS) to increase a number of opportunities for a UE 120 to transmit a RACH message and/or acquire the channel. As another example, a first beam may be associated with a spatial direction towards an area with a high concentration of UEs (e.g., as compared to another spatial direction), such as a public transportation terminal, an office building, a venue, and/or an arena, among other examples. In some aspects, a second beam may be associated with a spatial direction towards an area with a low concentration of UEs. Therefore, it may be desirable to provide a larger number of RACH occasions for the first beam (e.g., and the first downlink IAS) than a number of RACH occasions for the second beam (e.g., and the second downlink IAS), to increase a number of opportunities for UEs in the area of high concentration of UEs to acquire the channel.

For example, as shown by reference numbers 1010 and 1020, a first downlink IAS (e.g., DL IAS 1) may be associated with a first number (e.g., one) of RACH occasions (e.g., RO 1) and a second downlink IAS (e.g., DL IAS 2) may be associated with a second number (e.g., two) of RACH occasions (e.g., RO 2). Reference number 1010 may depict an unbalanced or non-uniform distribution of a number of RACH occasions mapped to each downlink IAS for a downlink IAS to RACH occasion association pattern that uses the first pattern as described above. Reference number 1020 may depict an unbalanced or non-uniform distribution of a number of RACH occasions mapped to each downlink IAS for a downlink IAS to RACH occasion association pattern that uses the second pattern as described above.

As indicated above, FIG. 10 is provided as an example. Other examples may differ from what is described with respect to FIG. 10.

Figure 11:
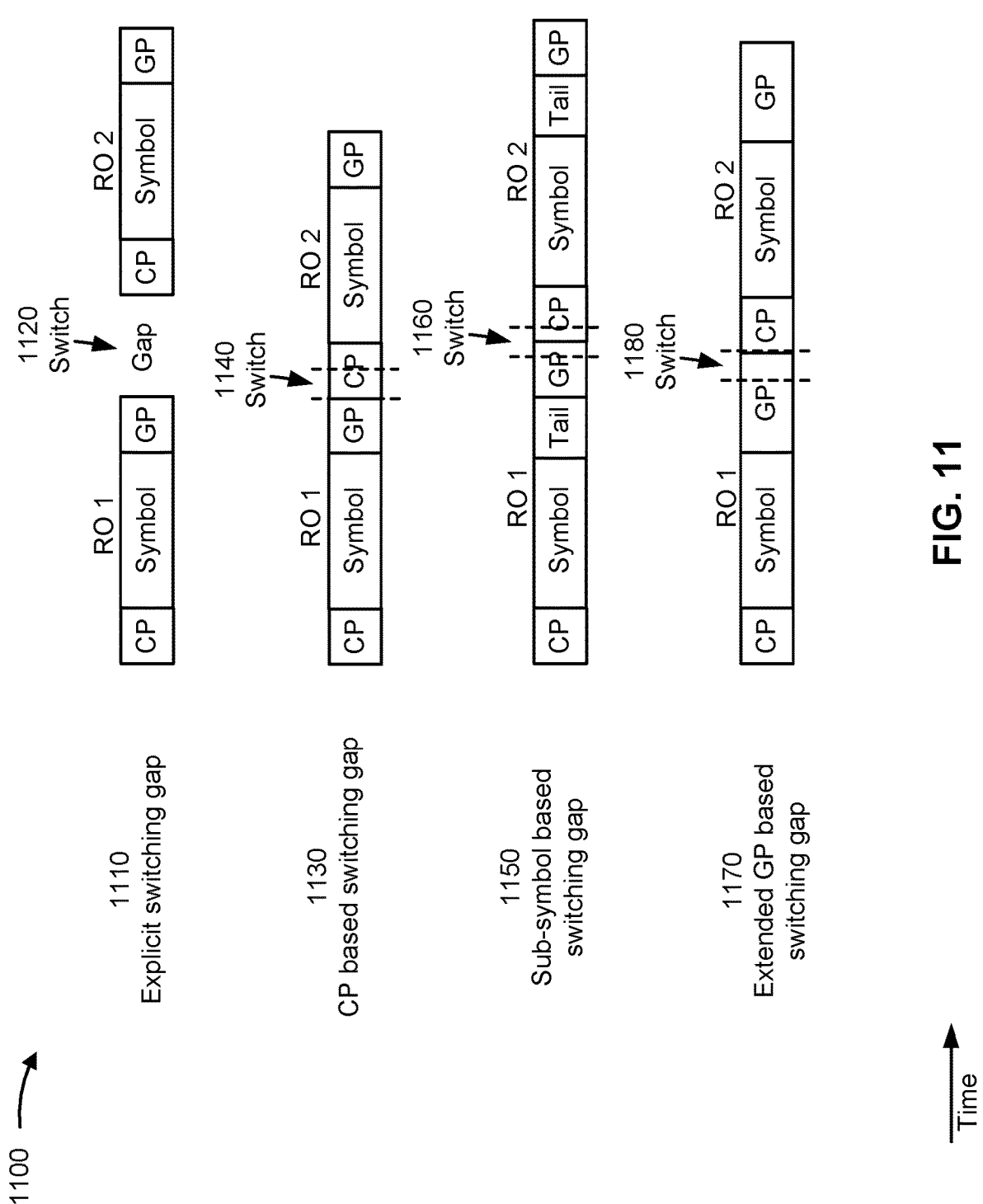

FIG. 11 is a diagram illustrating an example 1100 associated with downlink IAS to RACH occasion association, in accordance with the present disclosure. FIG. 11 depicts examples of different switching gaps or switching opportunities for a downlink IAS to RACH occasion association pattern. As described above, a switching gap or a switching opportunity may be used by a base station 110 and/or a UE 120 for performing beam switching (e.g., when using the first pattern as described above) and/or for performing downlink/uplink switching (e.g., when using the second pattern as described above). FIG. 11 depicts example switching gaps or switching opportunities between RACH occasions (e.g., between an RO 1 and an RO 2). However, similar switching gaps or switching opportunities may be included between downlink IASs, as described above.

As shown by reference number 1110, a switching gap or a switching opportunity may be an explicit switching gap. For example, as shown by reference number 1120, a switching gap or switching opportunity may occur during a time gap (e.g., one or more time domain resources that are not allocated for a signal) between the first RACH occasion and the second RACH occasion.

As shown by reference number 1130, a switching gap or a switching opportunity may be a CP based switching gap. For example, in some aspects, a duration of a CP (e.g., a time at the start of the RACH occasion) may be sufficient for a base station 110 and/or a UE 120 to perform switching (e.g., beam switching and/or downlink/uplink switching). As shown by reference number 1140, a switching gap or switching opportunity may occur during a CP (e.g., or a guard interval depending on a format of the RACH message or the downlink IAS) of the second RACH occasion (e.g., a RACH message transmitted using the second RACH occasion).

As shown by reference number 1150, a switching gap or a switching opportunity may be a sub-symbol based switching gap. For example, as described above, a tail symbol may be inserted into a RACH message generated by a UE 120. The tail symbol may be associated with one or more low energy samples inserted into the signal by the UE 120. The tail symbol may serve as an additional guard period (GP) for the RACH message. As a result, a base station 110 and/or a UE 120 may be enabled to perform switching (e.g., beam switching and/or downlink/uplink switching) during the guard period of the RACH message. For example, as shown by reference number 1160, a switching gap or switching opportunity may occur during a GP of the first RACH occasion (e.g., a RACH message transmitted using the first RACH occasion). In some aspects, the switching gap or switching opportunity may extend into a CP of the second RACH occasion (e.g., a RACH message transmitted using the second RACH occasion). In some aspects, a sub-symbol based switching gap may be used if a waveform type used by the base station 110 and/or the UE 120 is the DFT-s-OFDM waveform type.

As shown by reference number 1170, a switching gap or a switching opportunity may be an extended GP switching gap. For example, in some aspects, a UE 120 may (e.g., and/or a base station 110 may configure the UE 120 to) extend a duration of a GP of a RACH message. By extending the duration of the GP of the RACH message, the base station 110 and/or the UE 120 may be enabled to perform switching (e.g., beam switching and/or downlink/uplink switching) during the GP of the RACH message. For example, as shown by reference number 1180, a switching gap or switching opportunity may occur during an extended GP of the first RACH occasion (e.g., a RACH message transmitted using the first RACH occasion).

As indicated above, FIG. 11 is provided as an example. Other examples may differ from what is described with respect to FIG. 11.

FIG. 12 is a diagram illustrating an example process 1200 performed, for example, by a UE, in accordance with the present disclosure. Example process 1200 is an example where the UE (e.g., UE 120) performs operations associated with downlink IAS to RACH occasion association.

As shown in FIG. 12, in some aspects, process 1200 may include receiving, from a base station, configuration information indicating a downlink IAS RACH occasion association pattern, wherein the downlink IAS to RACH occasion association pattern indicates at least one of switching gaps between downlink IAS occasions and between RACH occasions or guard bands between RACH occasions (block 1210). For example, the UE (e.g., using reception component 1402, depicted in FIG. 14) may receive, from a base station, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions, as described above (e.g., with reference to FIGS. 7, 8, 9, 10, and/or 11).

As further shown in FIG. 12, in some aspects, process 1200 may include transmitting, to the base station, a RACH message using a RACH occasion according to the downlink IAS to RACH occasion association pattern (block 1220). For example, the UE (e.g., using transmission component 1404, depicted in FIG. 14) may transmit, to the base station, a RACH message using a RACH occasion according to the downlink IAS to RACH occasion association pattern, as described above (e.g., with reference to FIGS. 7, 8, 9, 10, and/or 11).

Process 1200 may include additional aspects, such as any single aspect or any combination of aspects described below and/or in connection with one or more other processes described elsewhere herein.

In a first aspect, the downlink IAS includes at an SSB signal, a CORESET signal, a DCI signal, an SIB signal, or any combination thereof.

In a second aspect, alone or in combination with the first aspect, receiving the configuration information includes receiving an indication that the downlink IAS to RACH occasion association pattern includes a group of downlink IAS occasions for different beams associated with the base station and a group of RACH occasions associated with the group of downlink IAS occasions, wherein the group of downlink IAS occasions are grouped together in a time domain and the group of RACH occasions are grouped together in the time domain.

In a third aspect, alone or in combination with one or more of the first and second aspects, the group of downlink IAS occasions includes switching gaps between downlink IAS occasions included in the group of downlink IAS occasions, and the group of RACH occasions includes switching gaps between RACH occasions included in the group of RACH occasions.

In a fourth aspect, alone or in combination with one or more of the first through third aspects, receiving the configuration information includes receiving an indication that the downlink IAS to RACH occasion association pattern includes a downlink IAS associated with a beam grouped with a RACH occasion associated with the beam in a time domain.

In a fifth aspect, alone or in combination with one or more of the first through fourth aspects, receiving the configuration information includes receiving an indication that the downlink IAS and the RACH occasion are multiplexed in at least one of the time domain or the frequency domain.

In a sixth aspect, alone or in combination with one or more of the first through fifth aspects, receiving the configuration information includes receiving an indication of a downlink/uplink switching gap between the downlink IAS and the RACH occasion.

In a seventh aspect, alone or in combination with one or more of the first through sixth aspects, the downlink IAS to RACH occasion association pattern is based at least in part on: a length of a downlink to uplink switching time of the base station, a length of a beam switching time of the base station, a number of downlink IAS occasions associated with the downlink IAS to RACH occasion association pattern, an amount of time associated with channel acquisition for the UE, or any combination thereof.

In an eighth aspect, alone or in combination with one or more of the first through seventh aspects, receiving the configuration information includes receiving an indication that the downlink IAS to RACH occasion association pattern includes a first order of RACH occasions in a time domain for a first association period and a second order of RACH occasions in the time domain for a second association period.

In a ninth aspect, alone or in combination with one or more of the first through eighth aspects, receiving the configuration information includes receiving an indication that the downlink IAS to RACH occasion association pattern includes a first downlink IAS associated with a first number of RACH occasions and a second downlink IAS associated with a second number of RACH occasions.

In a tenth aspect, alone or in combination with one or more of the first through ninth aspects, receiving the configuration information includes receiving an indication that the downlink IAS to RACH occasion association pattern includes a first RACH occasion frequency division multiplexed with a second RACH occasion and a guard band included between the first RACH occasion and the second RACH occasion in the frequency domain.

In an eleventh aspect, alone or in combination with one or more of the first through tenth aspects, receiving the configuration information includes receiving an indication that the downlink IAS to RACH occasion association pattern is associated with a single carrier waveform type.

In a twelfth aspect, alone or in combination with one or more of the first through eleventh aspects, receiving the configuration information includes receiving an indication that the switching gaps include at least one of downlink to uplink switching gaps or beam switching gaps, where a switching gap includes: an explicit switching gap, a switching gap included in a cyclic prefix, a sub-symbol switching gap, an extended guard period switching gap, or any combination thereof.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a base station, in accordance with the present disclosure. Example process 1300 is an example where the base station (e.g., base station 110) performs operations associated with downlink IAS to RACH occasion association.

As shown in FIG. 13, in some aspects, process 1300 may include transmitting, to one or more UEs, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions (block 1310). For example, the base station (e.g., using transmission component 1504, depicted in FIG. 15) may transmit, to one or more UEs, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions, as described above (e.g., with reference to FIGS. 7, 8, 9, 10, and/or 11).

As further shown in FIG. 13, in some aspects, process 1300 may include receiving, from a UE of the one or more UEs, a RACH message using a RACH occasion according to the downlink IAS to RACH occasion association pattern (block 1320). For example, the base station (e.g., using reception component 1502, depicted in FIG. 15) may receive, from a UE of the one or more UEs, a RACH message using a RACH occasion according to the downlink IAS to RACH occasion association pattern, as described above (e.g., with reference to FIGS. 7, 8, 9, 10, and/or 11).

Process 1300 may include additional aspects, such as any single aspect or any combination of aspects described below and/or in connection with one or more other processes described elsewhere herein.

In a first aspect, the downlink IAS includes at an SSB signal, a CORESET signal, a DCI signal, an SIB signal, or any combination thereof.

In a second aspect, alone or in combination with the first aspect, transmitting the configuration information includes transmitting an indication that the downlink IAS to RACH occasion association pattern includes a group of downlink IAS occasions for different beams associated with the base station and a group of RACH occasions associated with the group of downlink IAS occasions, where the group of downlink IAS occasions are grouped together in a time domain and the group of RACH occasions are grouped together in the time domain.

In a third aspect, alone or in combination with one or more of the first and second aspects, the group of downlink IAS occasions includes switching gaps between downlink IAS occasions included in the group of downlink IAS occasions, and the group of RACH occasions includes switching gaps between RACH occasions included in the group of RACH occasions.

In a fourth aspect, alone or in combination with one or more of the first through third aspects, transmitting the configuration information includes transmitting an indication that the downlink IAS to RACH occasion association pattern includes a downlink IAS associated with a beam grouped with a RACH occasion associated with the beam in a time domain.

In a fifth aspect, alone or in combination with one or more of the first through fourth aspects, transmitting the configuration information includes transmitting an indication that the downlink IAS and the RACH occasion are multiplexed in at least one of the time domain or a frequency domain.

In a sixth aspect, alone or in combination with one or more of the first through fifth aspects, transmitting the configuration information includes transmitting an indication of a downlink/uplink switching gap between the downlink IAS and the RACH occasion.

In a seventh aspect, alone or in combination with one or more of the first through sixth aspects, process 1300 includes determining the downlink IAS to RACH occasion association pattern based at least in part on: a length of a downlink to uplink switching time of the base station, a length of a beam switching time of the base station, a number of downlink IAS occasions associated with the downlink IAS to RACH occasion association pattern, an amount of time associated with channel acquisition for the UE, or any combination thereof.

In an eighth aspect, alone or in combination with one or more of the first through seventh aspects, process 1300 includes determining whether the downlink IAS to RACH occasion association pattern includes downlink IASs grouped together and RACH occasions group together, or downlink IASs and RACH occasions associated with a same beam grouped together.

In a ninth aspect, alone or in combination with one or more of the first through eighth aspects, transmitting the configuration information includes transmitting an indication that the downlink IAS to RACH occasion association pattern includes a first order of RACH occasions in a time domain for a first association period and a second order of RACH occasions in the time domain for a second association period.

In a tenth aspect, alone or in combination with one or more of the first through ninth aspects, transmitting the configuration information includes transmitting an indication that the downlink IAS to RACH occasion association pattern includes a first downlink IAS associated with a first number of RACH occasions and a second downlink IAS associated with a second number of RACH occasions.

In an eleventh aspect, alone or in combination with one or more of the first through tenth aspects, transmitting the configuration information includes transmitting an indication that the downlink IAS to RACH occasion association pattern includes a first RACH occasion frequency division multiplexed with a second RACH occasion and a guard band included between the first RACH occasion and the second RACH occasion in a frequency domain.

In a twelfth aspect, alone or in combination with one or more of the first through eleventh aspects, receiving the RACH message includes filtering a frequency domain resource allocation associated with the RACH occasion used to transmit the RACH message, and applying single carrier processing for the frequency domain resource allocation associated with the RACH occasion used to transmit the RACH message.

In a thirteenth aspect, alone or in combination with one or more of the first through twelfth aspects, transmitting the configuration information includes transmitting an indication that the downlink IAS to RACH occasion association pattern is associated with a single carrier waveform type.

In a fourteenth aspect, alone or in combination with one or more of the first through thirteenth aspects, transmitting the configuration information includes transmitting an indication that the switching gaps include at least one of downlink to uplink switching gaps or beam switching gaps, wherein a switching gap includes: an explicit switching gap, a switching gap included in a cyclic prefix, a sub-symbol switching gap, an extended guard period switching gap, or any combination thereof.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
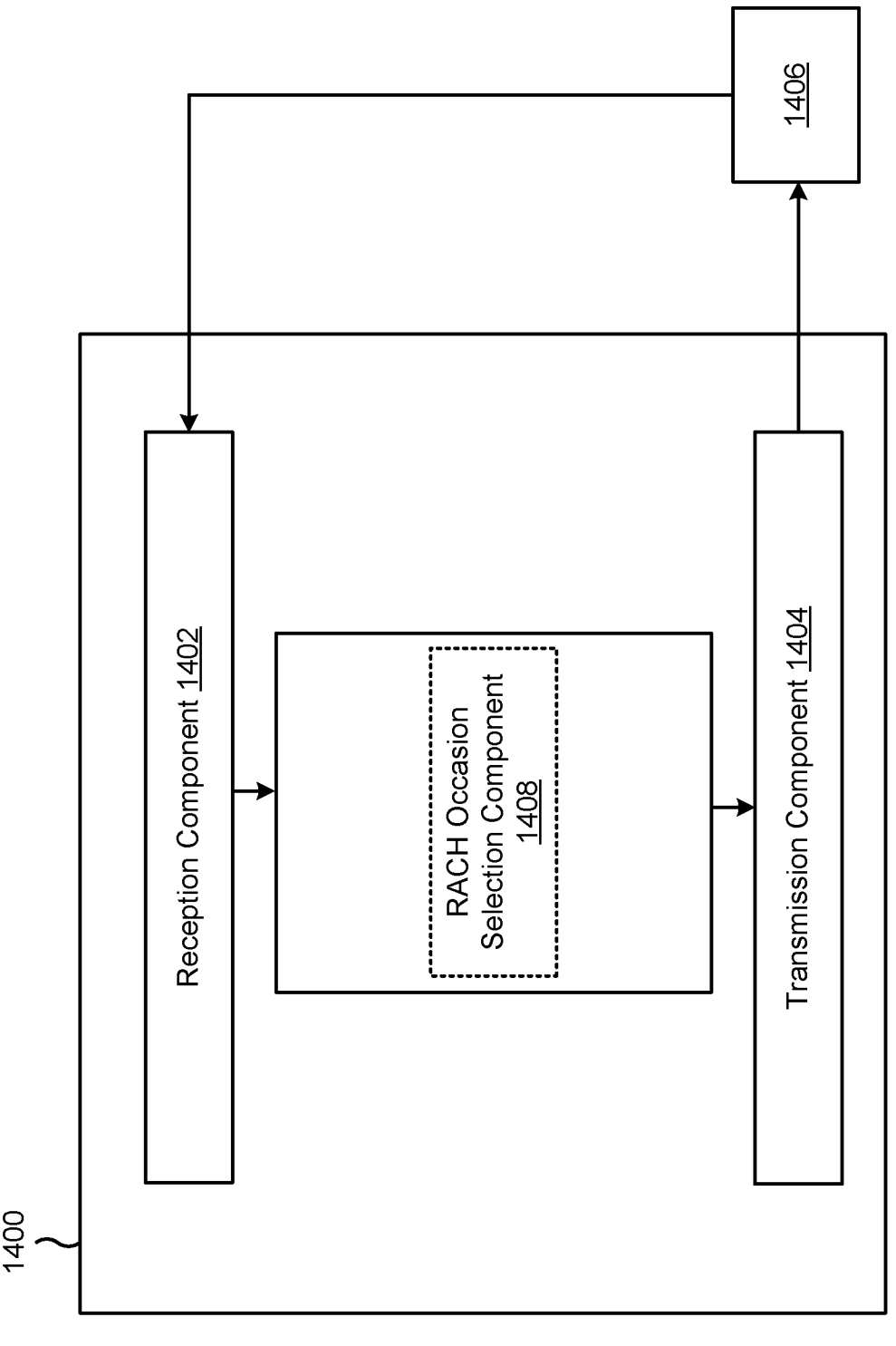
FIGS. 14 and 15 are block diagrams of example apparatuses for wireless communication, in accordance with the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a RACH occasion selection component 1408, among other examples.

In some aspects, the apparatus 1400 may be configured to perform one or more operations described herein in connection with FIGS. 7-11. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The reception component 1402 may receive, from a base station, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions. The transmission component 1404 may transmit, to the base station, a RACH message using a RACH occasion according to the downlink IAS to RACH occasion association pattern. The RACH occasion selection component 1408 may select the RACH occasion based at least in part on the downlink IAS to RACH occasion association pattern.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
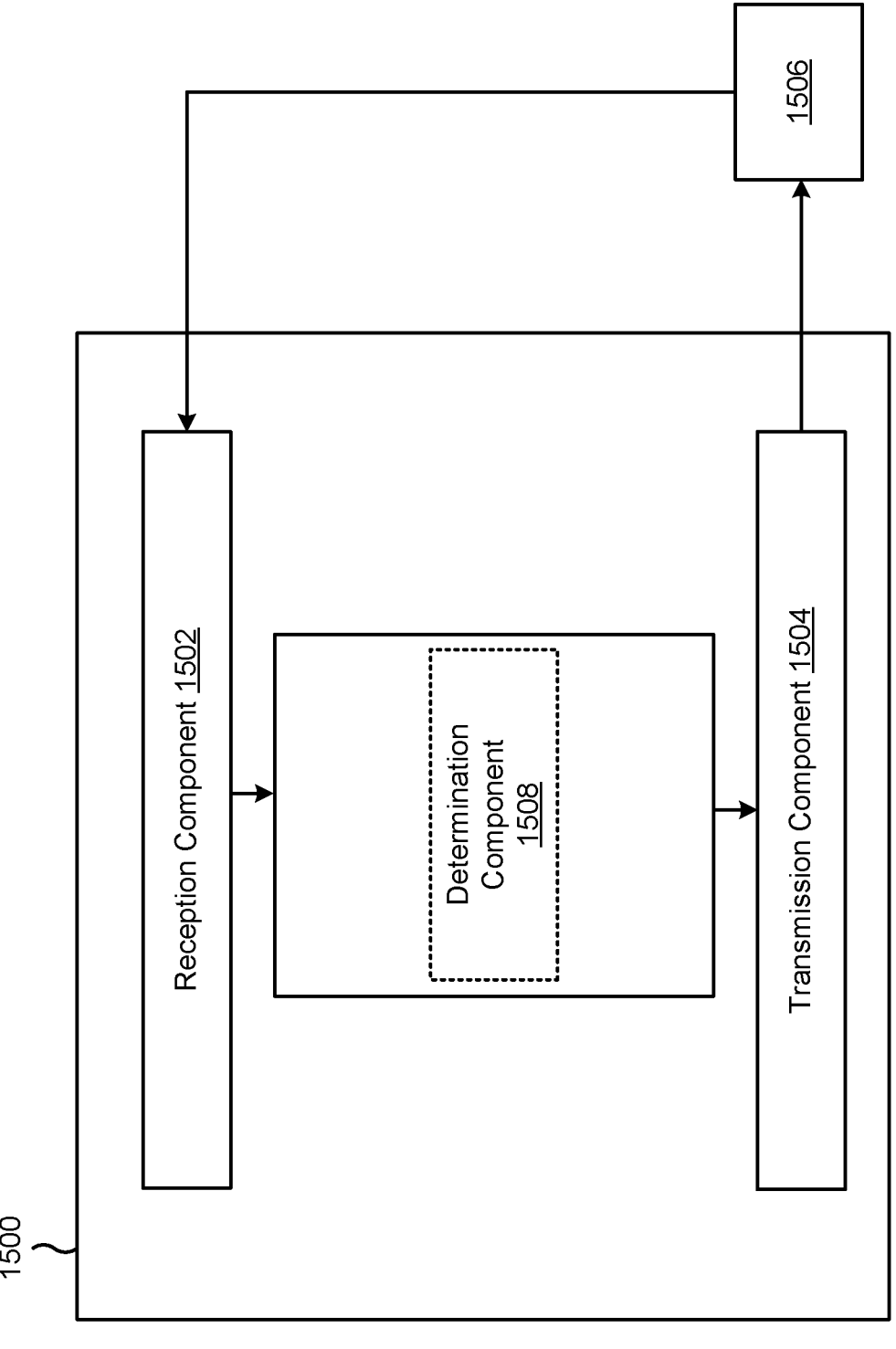

FIG. 15 is a block diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a determination component 1508, among other examples.

In some aspects, the apparatus 1500 may be configured to perform one or more operations described herein in connection with FIGS. 7-11. Additionally, or alternatively, the apparatus 1500 may be configured to perform one or more processes described herein, such as process 1300 of FIG. 13, or a combination thereof. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be co-located with the reception component 1502 in a transceiver.

The transmission component 1504 may transmit, to one or more UEs, configuration information indicating a downlink IAS to RACH occasion association pattern, wherein the downlink IAS to RACH occasion association pattern indicates at least one of switching gaps between downlink IAS occasions and between RACH occasions or guard bands between RACH occasions. The reception component 1502 may receive, from a UE of the one or more UEs, a RACH message using a RACH occasion according to the downlink IAS to RACH occasion association pattern.

The determination component 1508 may determine the downlink IAS to RACH occasion association pattern based at least in part on: a length of a downlink to uplink switching time of the base station, a length of a beam switching time of the base station, a number of downlink IAS occasions associated with the downlink IAS to RACH occasion association pattern, an amount of time associated with channel acquisition for the UE, or any combination thereof.

The determination component 1508 may determine whether the downlink IAS to RACH occasion association pattern includes downlink IASs grouped together and RACH occasions group together, or downlink IASs and RACH occasions associated with a same beam grouped together.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving, from a base station, configuration information indicating a downlink initial access signal (IAS) to random access channel (RACH) occasion association pattern, wherein the downlink IAS to RACH occasion association pattern indicates at least one of switching gaps between downlink IAS occasions and between RACH occasions or guard bands between RACH occasions; and transmitting, to the base station, a RACH message using a RACH occasion according to the downlink IAS to RACH occasion association pattern.

Aspect 2: The method of Aspect 1, wherein the downlink IAS includes: a synchronization signal block (SSB) signal, a control resource set (CORESET) signal, a downlink control information (DCI) signal, a system information block (SIB) signal, or any combination thereof.

Aspect 3: The method of any of Aspects 1-2, wherein receiving the configuration information comprises: receiving an indication that the downlink IAS to RACH occasion association pattern includes a group of downlink IAS occasions for different beams associated with the base station and a group of RACH occasions associated with the group of downlink IAS occasions, wherein the group of downlink IAS occasions are grouped together in a time domain and the group of RACH occasions are grouped together in the time domain.

Aspect 4: The method of Aspect 3, wherein the group of downlink IAS occasions includes switching gaps between downlink IAS occasions included in the group of downlink IAS occasions, and wherein the group of RACH occasions includes switching gaps between RACH occasions included in the group of RACH occasions.

Aspect 5: The method of any of Aspects 1-2, wherein receiving the configuration information comprises: receiving an indication that the downlink IAS to RACH occasion association pattern includes a downlink IAS associated with a beam grouped with a RACH occasion associated with the beam in a time domain.

Aspect 6: The method of Aspect 5, wherein receiving the configuration information comprises: receiving an indication that the downlink IAS and the RACH occasion are multiplexed in at least one of the time domain or a frequency domain.

Aspect 7: The method of any of Aspects 5-6, wherein receiving the configuration information comprises: receiving an indication of a downlink/uplink switching gap between the downlink IAS and the RACH occasion.

Aspect 8: The method of any of Aspects 1-7, wherein the downlink IAS to RACH occasion association pattern is based at least in part on: a length of a downlink to uplink switching time of the base station, a length of a beam switching time of the base station, a number of downlink IAS occasions associated with the downlink IAS to RACH occasion association pattern, an amount of time associated with channel acquisition for the UE, or any combination thereof.

Aspect 9: The method of any of Aspects 1-8, wherein receiving the configuration information comprises: receiving an indication that the downlink IAS to RACH occasion association pattern includes a first order of RACH occasions in a time domain for a first association period and a second order of RACH occasions in the time domain for a second association period.

Aspect 10: The method of any of Aspects 1-9, wherein receiving the configuration information comprises: receiving an indication that the downlink IAS to RACH occasion association pattern includes a first downlink IAS associated with a first number of RACH occasions and a second downlink IAS associated with a second number of RACH occasions.

Aspect 11: The method of any of Aspects 1-10, wherein receiving the configuration information comprises: receiving an indication that the downlink IAS to RACH occasion association pattern includes a first RACH occasion frequency division multiplexed with a second RACH occasion and a guard band included between the first RACH occasion and the second RACH occasion in a frequency domain.

Aspect 12: The method of Aspect 11, wherein receiving the configuration information comprises: receiving an indication that the downlink IAS to RACH occasion association pattern is associated with a single carrier waveform type.

Aspect 13: The method of any of Aspects 1-12, wherein receiving the configuration information comprises: receiving an indication that the switching gaps include at least one of downlink to uplink switching gaps or beam switching gaps, wherein a switching gap includes: an explicit switching gap, a switching gap included in a cyclic prefix, a sub-symbol switching gap, an extended guard period switching gap, or any combination thereof.

Aspect 14: A method of wireless communication performed by a base station, comprising: transmitting, to one or more user equipments (UEs), configuration information indicating a downlink initial access signal (IAS) to random access channel (RACH) occasion association pattern, wherein the downlink IAS to RACH occasion association pattern indicates at least one of switching gaps between downlink IAS occasions and between RACH occasions or guard bands between RACH occasions; and receiving, from a UE of the one or more UEs, a RACH message using a RACH occasion according to the downlink IAS to RACH occasion association pattern.

Aspect 15: The method of Aspect 14, wherein the downlink IAS includes: a synchronization signal block (SSB) signal, a control resource set (CORESET) signal, a downlink control information (DCI) signal, a system information block (SIB) signal, or any combination thereof.

Aspect 16: The method of any of Aspects 14-15, wherein transmitting the configuration information comprises: transmitting an indication that the downlink IAS to RACH occasion association pattern includes a group of downlink IAS occasions for different beams associated with the base station and a group of RACH occasions associated with the group of downlink IAS occasions, wherein the group of downlink IAS occasions are grouped together in a time domain and the group of RACH occasions are grouped together in the time domain.

Aspect 17: The method of Aspect 16, wherein the group of downlink IAS occasions includes switching gaps between downlink IAS occasions included in the group of downlink IAS occasions, and wherein the group of RACH occasions includes switching gaps between RACH occasions included in the group of RACH occasions.

Aspect 18: The method of any of Aspects 14-15, wherein transmitting the configuration information comprises: transmitting an indication that the downlink IAS to RACH occasion association pattern includes a downlink IAS associated with a beam grouped with a RACH occasion associated with the beam in a time domain.

Aspect 19: The method of Aspect 18, wherein transmitting the configuration information comprises: transmitting an indication that the downlink IAS and the RACH occasion are multiplexed in at least one of the time domain or a frequency domain.

Aspect 20: The method of any of Aspects 18-19, wherein transmitting the configuration information comprises: transmitting an indication of a downlink/uplink switching gap between the downlink IAS and the RACH occasion.

Aspect 21: The method of any of Aspects 14-20, further comprising: determining the downlink IAS to RACH occasion association pattern based at least in part on: a length of a downlink to uplink switching time of the base station, a length of a beam switching time of the base station, a number of downlink IAS occasions associated with the downlink IAS to RACH occasion association pattern, an amount of time associated with channel acquisition for the UE, or any combination thereof.

Aspect 22: The method of any of Aspects 14-21, further comprising: determining whether the downlink IAS to RACH occasion association pattern includes: downlink IASs grouped together and RACH occasions group together, or downlink IASs and RACH occasions associated with a same beam grouped together.

Aspect 23: The method of any of Aspects 14-22, wherein transmitting the configuration information comprises: transmitting an indication that the downlink IAS to RACH occasion association pattern includes a first order of RACH occasions in a time domain for a first association period and a second order of RACH occasions in the time domain for a second association period.

Aspect 24: The method of any of Aspects 14-23, wherein transmitting the configuration information comprises: transmitting an indication that the downlink IAS to RACH occasion association pattern includes a first downlink IAS associated with a first number of RACH occasions and a second downlink IAS associated with a second number of RACH occasions.

Aspect 25: The method of any of Aspects 14-24, wherein transmitting the configuration information comprises: transmitting an indication that the downlink IAS to RACH occasion association pattern includes a first RACH occasion frequency division multiplexed with a second RACH occasion and a guard band included between the first RACH occasion and the second RACH occasion in a frequency domain.

Aspect 26: The method of Aspect 25, wherein receiving the RACH message comprises: filtering a frequency domain resource allocation associated with the RACH occasion used to transmit the RACH message; and applying single carrier processing for the frequency domain resource allocation associated with the RACH occasion used to transmit the RACH message.

Aspect 27: The method of any of Aspects 25-26, wherein transmitting the configuration information comprises: transmitting an indication that the downlink IAS to RACH occasion association pattern is associated with a single carrier waveform type.

Aspect 28: The method of any of Aspects 14-27, wherein transmitting the configuration information comprises: transmitting an indication that the switching gaps include at least one of downlink to uplink switching gaps or beam switching gaps, wherein a switching gap includes: an explicit switching gap, a switching gap included in a cyclic prefix, a sub-symbol switching gap, an extended guard period switching gap, or any combination thereof.

Aspect 29: An apparatus for wireless communication at a device, comprising a processor; memory coupled with the processor; and instructions stored in the memory and executable by the processor to cause the apparatus to perform the method of one or more Aspects of Aspects 1-13.

Aspect 30: A device for wireless communication, comprising a memory and one or more processors coupled to the memory, the memory and the one or more processors configured to perform the method of one or more Aspects of Aspects 1-13.

Aspect 31: An apparatus for wireless communication, comprising at least one means for performing the method of one or more Aspects of Aspects 1-13.

Aspect 32: A non-transitory computer-readable medium storing code for wireless communication, the code comprising instructions executable by a processor to perform the method of one or more Aspects of Aspects 1-13.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 34: An apparatus for wireless communication at a device, comprising a processor; memory coupled with the processor; and instructions stored in the memory and executable by the processor to cause the apparatus to perform the method of one or more Aspects of Aspects 14-28.

Aspect 35: A device for wireless communication, comprising a memory and one or more processors coupled to the memory, the memory and the one or more processors configured to perform the method of one or more Aspects of Aspects 14-28.

Aspect 36: An apparatus for wireless communication, comprising at least one means for performing the method of one or more Aspects of Aspects 14-28.

Aspect 37: A non-transitory computer-readable medium storing code for wireless communication, the code comprising instructions executable by a processor to perform the method of one or more Aspects of Aspects 14-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 14-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:

receive, from a base station, configuration information indicating a downlink initial access signal (IAS) to random access channel (RACH) occasion association pattern that is based at least in part on a comparison between a length of a downlink to uplink switching time of the base station and a length of a beam switching time of the base station, wherein the downlink IAS to RACH occasion association pattern indicates switching gaps between one or more of:
at least two downlink IAS occasions,
at least two RACH occasions corresponding to a plurality of synchronization signal blocks (SSBs), or
at least one downlink IAS occasion and at least one RACH occasion; and
transmit, to the base station, a RACH message in accordance with the downlink IAS to RACH occasion association pattern.

2. The UE of claim 1, wherein the one or more processors, to receive the configuration information, are configured to:
receive an indication that the downlink IAS to RACH occasion association pattern includes:
a plurality of downlink IAS occasions, the plurality of downlink IAS occasions including at least one first downlink IAS occasion for a first beam associated with the base station and at least one second downlink IAS occasion for a second beam associated with the base station that is different than the first beam, and
a plurality of RACH occasions associated with the plurality of downlink IAS occasions,
wherein the plurality of downlink IAS occasions are grouped together in a time domain and the plurality of RACH occasions are grouped together in the time domain.

3. The UE of claim 2,
wherein the downlink IAS to RACH occasion association pattern indicates switching gaps between at least two downlink IAS occasions, wherein the plurality of downlink IAS occasions includes switching gaps between downlink IAS occasions included in the plurality of downlink IAS occasions, or
wherein the downlink IAS to RACH occasion association pattern indicates switching gaps between at least two RACH occasions, wherein the plurality of RACH occasions includes switching gaps between RACH occasions included in the plurality of RACH occasions.

4. The UE of claim 1, wherein the downlink IAS to RACH occasion association pattern indicates switching gaps between at least one downlink IAS occasion and at least one RACH occasion, and
wherein the one or more processors, to receive the configuration information, are configured to:
receive an indication that the downlink IAS to RACH occasion association pattern includes a downlink IAS associated with a beam grouped with a RACH occasion associated with the beam in a time domain.

5. The UE of claim 4, wherein the one or more processors, to receive the configuration information, are configured to:
receive an indication that the downlink IAS and the RACH occasion are multiplexed in a time domain.

6. The UE of claim 4, wherein the one or more processors, to receive the configuration information, are configured to:
receive an indication of a downlink/uplink switching gap between the downlink IAS and the RACH occasion.

7. The UE of claim 1, wherein the downlink IAS to RACH occasion association pattern is further based at least in part on:

a number of downlink IAS occasions associated with the downlink IAS to RACH occasion association pattern, an amount of time associated with channel acquisition for the UE, or any combination thereof.

8. The UE of claim 1, wherein the one or more processors, to receive the configuration information, are configured to:

receive an indication that the downlink IAS to RACH occasion association pattern includes a varied ordering of RACH occasions between a first association period and a second association period, the varied ordering comprising a first order of RACH occasions in a time domain for the first association period and a second order of RACH occasions in the time domain for the second association period.

9. The UE of claim 1, wherein the one or more processors, to receive the configuration information, are configured to:

receive an indication that the downlink IAS to RACH occasion association pattern includes a first downlink IAS associated with a first number of RACH occasions and a second downlink IAS associated with a second number of RACH occasions, the first number of RACH occasions corresponding to a different number of RACH occasions relative to the second number of RACH occasions.

10. The UE of claim 1, wherein the one or more processors, to receive the configuration information, are configured to:

receive an indication that the downlink IAS to RACH occasion association pattern includes a first RACH occasion frequency division multiplexed with a second RACH occasion and a guard band included between the first RACH occasion and the second RACH occasion in a frequency domain.

11. The UE of claim 10, wherein the one or more processors, to receive the configuration information, are configured to:

receive an indication that the downlink IAS to RACH occasion association pattern is associated with a single carrier waveform type.

12. The UE of claim 1, wherein the one or more processors, to receive the configuration information, are configured to:

receive an indication that the switching gaps include at least one of downlink to uplink switching gaps or beam switching gaps, wherein a switching gap includes:

an explicit switching gap, a switching gap included in a cyclic prefix, a sub-symbol switching gap, an extended guard period switching gap, or any combination thereof.

13. The UE of claim 1, wherein a downlink IAS associated with the downlink IAS to RACH occasion association pattern includes a system information block (SIB) signal.

14. The UE of claim 1, wherein the configuration information includes an indication of whether the downlink IAS to RACH occasion association pattern is mapped in the time domain only or in both time and frequency domains.

15. A method of wireless communication performed by a user equipment (UE), comprising:

receiving, from a base station, configuration information indicating a downlink initial access signal (IAS) to random access channel (RACH) occasion association pattern that is based at least in part on a comparison between a length of a downlink to uplink switching time of the base station and a length of a beam switching time of the base station, wherein the downlink IAS to RACH occasion association pattern indicates switching gaps between one or more of:

at least two downlink IAS occasions, at least two RACH occasions corresponding to a plurality of synchronization signal blocks (SSBs), or at least one downlink IAS occasion and at least one RACH occasion; and transmitting, to the base station, a RACH message in accordance with the downlink IAS to RACH occasion association pattern.

16. The method of claim 15, wherein receiving the configuration information comprises:

receiving an indication that the downlink IAS to RACH occasion association pattern includes:

a plurality of downlink IAS occasions, the plurality of downlink IAS occasions including at least one first downlink IAS occasion for a first beam associated with the base station and at least one second downlink IAS occasion for a second beam associated with the base station that is different than the first beam, and a plurality of RACH occasions associated with the plurality of downlink IAS occasions, wherein the plurality of downlink IAS occasions are grouped together in a time domain and the plurality of RACH occasions are grouped together in the time domain.

17. The method of claim 16, wherein the downlink IAS to RACH occasion association pattern indicates switching gaps between at least two downlink IAS occasions, wherein the plurality of downlink IAS occasions includes switching gaps between downlink IAS occasions included in the plurality of downlink IAS occasions, or wherein the downlink IAS to RACH occasion association pattern indicates switching gaps between at least two RACH occasions, wherein the plurality of RACH occasions includes switching gaps between RACH occasions included in the plurality of RACH occasions.

18. The method of claim 15, wherein the downlink IAS to RACH occasion association pattern indicates switching gaps between at least one downlink IAS occasion and at least one RACH occasion, and wherein receiving the configuration information comprises:

receiving an indication that the downlink IAS to RACH occasion association pattern includes a downlink IAS associated with a beam grouped with a RACH occasion associated with the beam in a time domain.

19. The method of claim 18, wherein receiving the configuration information comprises:

receiving an indication that the downlink IAS and the RACH occasion are multiplexed in a time domain.

20. The method of claim 18, wherein receiving the configuration information comprises:

receiving an indication of a downlink/uplink switching gap between the downlink IAS and the RACH occasion.

21. The method of claim 15, wherein receiving the configuration information comprises:

receiving an indication that the downlink IAS to RACH occasion association pattern includes a varied ordering of RACH occasions between a first association period and a second association period, the varied ordering comprising a first order of RACH occasions in a time domain for the first association period and a second order of RACH occasions in the time domain for the second association period.

22. The method of claim 15, wherein receiving the configuration information comprises:
receiving an indication that the downlink IAS to RACH occasion association pattern includes a first downlink IAS associated with a first number of RACH occasions and a second downlink IAS associated with a second number of RACH occasions, the first number of RACH occasions corresponding to a different number of RACH occasions relative to the second number of RACH occasions.

23. The method of claim 15, wherein receiving the configuration information comprises:
receiving an indication that the downlink IAS to RACH occasion association pattern includes a first RACH occasion frequency division multiplexed with a second RACH occasion and a guard band included between the first RACH occasion and the second RACH occasion in a frequency domain.

24. The method of claim 23, wherein receiving the configuration information comprises:
receiving an indication that the downlink IAS to RACH occasion association pattern is associated with a single carrier waveform type.

25. The method of claim 15, wherein receiving the configuration information comprises:
receiving an indication that the switching gaps include at least one of downlink to uplink switching gaps or beam switching gaps, wherein a switching gap includes:
an explicit switching gap,
a switching gap included in a cyclic prefix,
a sub-symbol switching gap,
an extended guard period switching gap, or
any combination thereof.

26. A base station for wireless communication, comprising:
a memory; and
one or more processors, coupled to the memory, configured to:
transmit, to one or more user equipments (UEs), configuration information indicating a downlink initial access signal (IAS) to random access channel (RACH) occasion association pattern that is based at least in part on a comparison between a length of a downlink to uplink switching time of the base station and a length of a beam switching time of the base station, wherein the downlink IAS to RACH occasion association pattern indicates switching gaps between one or more of:
at least two downlink IAS occasions,
at least two RACH occasions corresponding to a plurality of synchronization signal blocks (SSBs), or
at least one downlink IAS occasion and at least one RACH occasion; and
receive, from a UE of the one or more UEs, a RACH message in accordance with the downlink IAS to RACH occasion association pattern.

27. The base station of claim 26, wherein the one or more processors, to transmit the configuration information, are configured to:

transmit an indication that the downlink IAS to RACH occasion association pattern includes:
a plurality of downlink IAS occasions, the plurality of downlink IAS occasions including at least one first downlink IAS occasion for a first beam associated with the base station and at least one second downlink IAS occasion for a second beam associated with the base station that is different than the first beam, and
a plurality of RACH occasions associated with the plurality of downlink IAS occasions,
wherein the plurality of downlink IAS occasions are grouped together in a time domain and the plurality of RACH occasions are grouped together in the time domain.

28. A method of wireless communication performed by a base station, comprising:
transmitting, to one or more user equipments (UEs), configuration information indicating a downlink initial access signal (IAS) to random access channel (RACH) occasion association pattern that is based at least in part on a comparison between a length of a downlink to uplink switching time of the base station and a length of a beam switching time of the base station, wherein the downlink IAS to RACH occasion association pattern indicates switching gaps between one or more of:
at least two downlink IAS occasions,
at least two RACH occasions corresponding to a plurality of synchronization signal blocks (SSBs), or
at least one downlink IAS occasion and at least one RACH occasion; and
receiving, from a UE of the one or more UEs, a RACH message in accordance with the downlink IAS to RACH occasion association pattern.

29. The method of claim 28, wherein transmitting the configuration information comprises:
transmitting an indication that the downlink IAS to RACH occasion association pattern includes:
a plurality of downlink IAS occasions, the plurality of downlink IAS occasions including at least one first downlink IAS occasion for a first beam associated with the base station and at least one second downlink IAS occasion for a second beam associated with the base station that is different than the first beam, and
a plurality of RACH occasions associated with the plurality of downlink IAS occasions,
wherein the plurality of downlink IAS occasions are grouped together in a time domain and the plurality of RACH occasions are grouped together in the time domain.

30. The method of claim 28, wherein the downlink IAS to RACH occasion association pattern indicates switching gaps between at least one downlink IAS occasion and at least one RACH occasion, and
wherein transmitting the configuration information comprises:
transmitting an indication that the downlink IAS to RACH occasion association pattern includes a downlink IAS associated with a beam grouped with a RACH occasion associated with the beam in a time domain.

* * * * *